United States Patent
Brunschwiler et al.

(10) Patent No.: US 10,107,426 B2
(45) Date of Patent: Oct. 23, 2018

(54) RELEASABLE, THREADLESS CONDUIT CONNECTOR FOR LIQUID MANIFOLD

(71) Applicant: INTERNATIONAL BUSINESS MACHINES CORPORATION, Armonk, NY (US)

(72) Inventors: Thomas J. Brunschwiler, Thalwil (CH); Evan G. Colgan, Montvale, NJ (US); Michael J. Ellsworth, Jr., Poughkeepsie, NY (US); Gerd Schlottig, Uitikon Waldegg (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 450 days.

(21) Appl. No.: 14/824,515

(22) Filed: Aug. 12, 2015

(65) Prior Publication Data

US 2016/0059367 A1    Mar. 3, 2016

Related U.S. Application Data

(63) Continuation of application No. 14/469,891, filed on Aug. 27, 2014.

(51) Int. Cl.
*F16L 21/00* (2006.01)
*F16L 21/03* (2006.01)
(Continued)

(52) U.S. Cl.
CPC .......... *F16L 21/03* (2013.01); *F16L 37/0985* (2013.01); *F16L 37/138* (2013.01); *F28F 1/00* (2013.01);
(Continued)

(58) Field of Classification Search
CPC ..... F16L 21/03; F16L 37/0985; F16L 37/138; F28F 3/12; F28F 9/0258; F28F 9/027; F28F 1/00
See application file for complete search history.

(56) References Cited

U.S. PATENT DOCUMENTS 3,751,078 A    8/1973    O'Brian et al.
4,887,849 A    12/1989   Briet
(Continued)

OTHER PUBLICATIONS

Brunschwiler et al., "Releasable, Threadless Conduit Connector for Liquid Manifold", U.S. Appl. No. 14/469,891, filed Aug. 27, 2014 (58 pages).
(Continued)

*Primary Examiner* — Richard Chang
(74) *Attorney, Agent, or Firm* — Tihon Poltavets, Esq.; Kevin P. Radigan Esq.; Heslin Rothenberg Farley & Mesiti P.C.

(57) ABSTRACT

Conduit connectors for liquid manifolds and methods of fabrication are provided. In one embodiment, a conduit connector is integrated, at least in part, within a liquid manifold, and includes a conduit-receiving opening or socket and at least one releasable retention component. The conduit-receiving opening is disposed within the liquid manifold and in fluid communication with at least one liquid-carrying channel of the liquid manifold. The releasable retention component(s) is selectively operative to threadlessly secure in a fluid-tight manner a conduit within the conduit-receiving opening in fluid communication with the at least one liquid-carrying channel of the liquid manifold to facilitate flow of liquid through the liquid-carrying channel(s), or to release the conduit from the conduit-receiving opening of the conduit connector. The releasable retention component(s) resides at least partially within the
(Continued)

liquid manifold when operatively holding the conduit within the conduit-receiving opening.

15 Claims, 18 Drawing Sheets

(51) Int. Cl.
*F28F 1/00* (2006.01)
*F16L 37/098* (2006.01)
*F16L 37/138* (2006.01)
*F28F 3/12* (2006.01)
*F28F 9/02* (2006.01)

(52) U.S. Cl.
CPC ............... *F28F 3/12* (2013.01); *F28F 9/027* (2013.01); *F28F 9/0258* (2013.01)

(56) References Cited

U.S. PATENT DOCUMENTS

| | | | |
|---|---|---|---|
| 5,096,235 A * | 3/1992 | Oetiker | B25B 27/10 285/308 |
| 5,555,929 A | 9/1996 | Ishikawa | |
| 5,593,188 A | 1/1997 | McNaughton et al. | |
| 6,199,913 B1 | 3/2001 | Wang | |
| 6,301,926 B1 | 10/2001 | Avequin et al. | |
| 6,848,723 B2 | 2/2005 | Lamich | |
| 6,869,108 B2 | 3/2005 | Kwon et al. | |
| 7,229,103 B2 | 6/2007 | Igami | |
| 7,486,514 B2 | 2/2009 | Campbell et al. | |
| 7,527,300 B2 | 5/2009 | Li | |
| 7,965,509 B2 | 6/2011 | Campbell et al. | |
| 8,297,611 B2 | 10/2012 | Proulx et al. | |
| 8,418,517 B2 | 4/2013 | Uneno | |
| 8,542,488 B2 | 9/2013 | Peterson et al. | |
| 8,628,119 B2 | 1/2014 | Hasunuma et al. | |
| 2006/0220380 A1 | 10/2006 | Yoshino | |
| 2008/0296007 A1 | 12/2008 | Harris | |
| 2010/0025006 A1 | 2/2010 | Zhou | |
| 2013/0264701 A1 | 10/2013 | Loong et al. | |
| 2014/0078672 A1 | 3/2014 | Brunschwiler et al. | |

OTHER PUBLICATIONS

Brunschwiler et al., Supplemental List of Patent Applications to be Treated as Related, for U.S. Appl. No. 14/824,515, filed Aug. 12, 2015 (2 pages).

Brunschwiler et al., "Releasable, Threadless Conduit Connector for Liquid Manifold", U.S. Appl. No. 15/879,567, filed Jan. 25, 2018 (57 pages).

Brunschwiler et al., "Replacement List of IBM Patents or Patent Applications Treated as Related", U.S. Appl. No. 14/824,515, filed Aug. 12, 2015, dated Jan. 25, 2018 (2 pages).

* cited by examiner

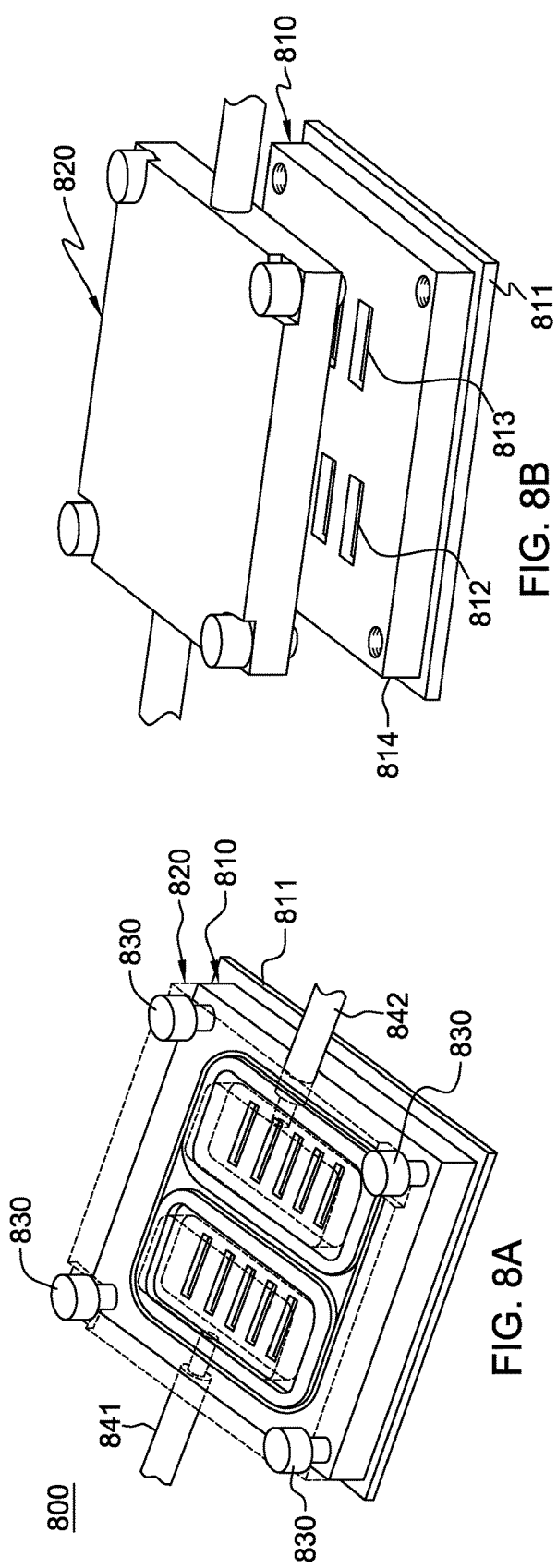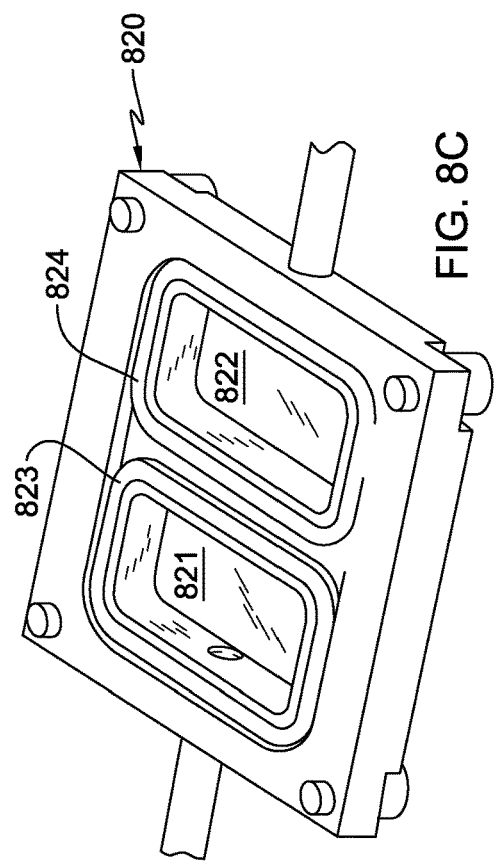

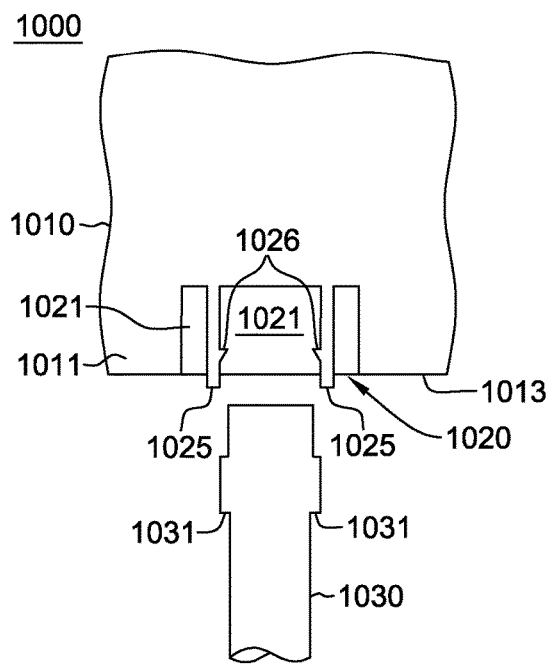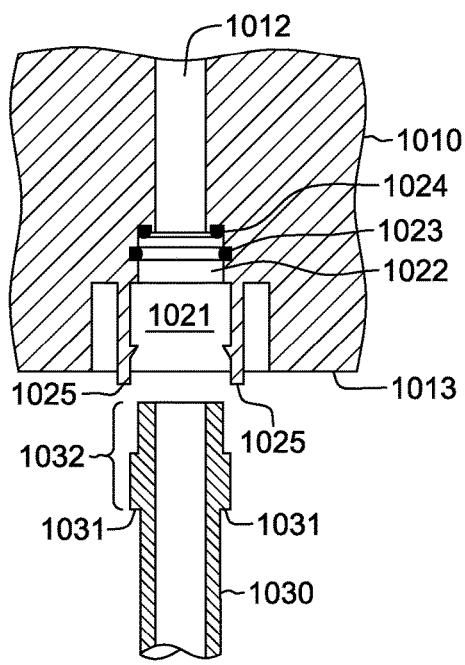
FIG. 10A  FIG. 10B
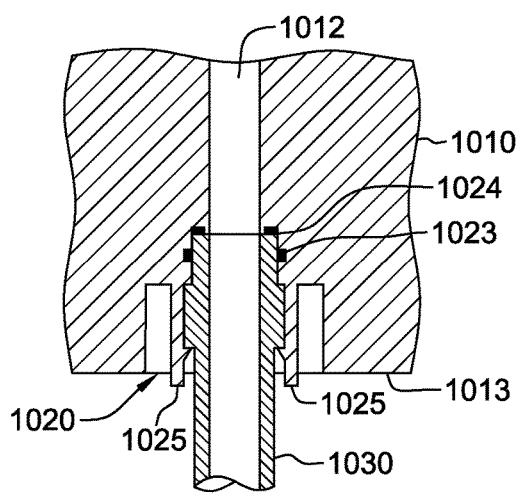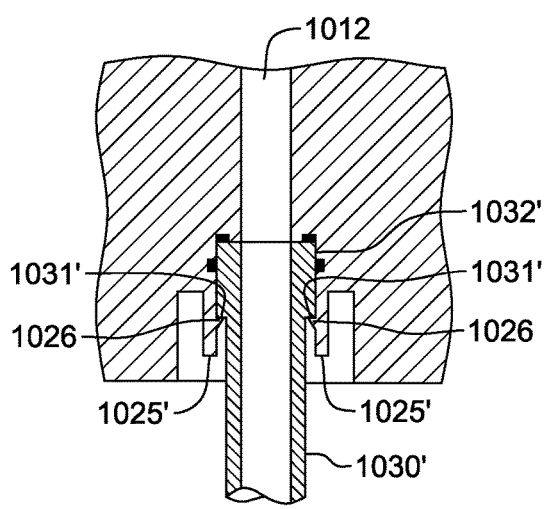
FIG. 10C  FIG. 10D

US 10,107,426 B2

RELEASABLE, THREADLESS CONDUIT CONNECTOR FOR LIQUID MANIFOLD

BACKGROUND

Connectors for hollow, liquid-carrying conduits or tubes have been realized in a great variety of types and shapes. These connectors include threaded fittings, push-fit connectors, flange and/or hinge-based fittings, as well as barb fittings.

In certain applications, connectors are desired for coupling conduits to liquid manifolds, such as a liquid-cooled assembly configured to couple to at least one electronic component to be cooled to facilitate removal of heat generated by the at least one electronic component.

Many conventional connectors pose disadvantages when employed with liquid manifolds, such as the above-noted liquid-cooled assembly. For instance, with few exceptions, most thread-based connectors apply a torque moment on at least one of the connecting partners. A torque is an undesired load to an electronic assembly, especially assemblies with high interconnect densities with multiple mismatching materials brought close together. Flange-based couplings demand a high material and space volume, while barbed fittings raise the question of multiple uses of the female connector part, and potentially require a higher tooling complexity. Connecting fittings that require an outer hinge-type feature, such as barb and flange fittings, are comparably time consuming to employ. In addition, push-fit connectors typically require either an insert for a liquid-carrying manifold or complex tooling.

BRIEF SUMMARY

The shortcomings of the prior art are overcome and additional advantages are provided through the provision of a method which includes: providing a liquid manifold comprising at least one liquid-carrying channel; and integrating a conduit connector, at least in part, within the liquid manifold. The conduit connector includes: a conduit-receiving opening in the liquid manifold and in fluid communication with the at least one liquid-carrying channel of the liquid manifold; and at least one releasable retention component selectively operative to threadlessly secure in a fluid-tight manner a conduit within the conduit-receiving opening in fluid communication with the at least one liquid-carrying channel of the liquid manifold assembly to facilitate flow of liquid therethrough, or to release the conduit from the conduit-receiving opening of the conduit connector. The at least one releasable retention component resides at least partially within the liquid manifold when operatively, threadlessly securing the conduit within the conduit-receiving opening.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 8A depicts another embodiment of a cooled electronic assembly comprising a coolant-cooled electronic module and a liquid manifold, within which one or more conduit connectors may be employed, in accordance with one or more aspects of the present invention;

FIG. 8B depicts the cooled electronic assembly of FIG. 8A, with the liquid manifold and coolant-cooled electronic module shown detached, in accordance with one or more aspects of the present invention;

FIG. 8C depicts an interface surface of the liquid manifold of FIGS. 8A & 8B, configured to couple to the coolant-cooled electronic module, in accordance with one or more aspects of the present invention;

FIG. 10A is a top plan view of one embodiment of a liquid manifold and a conduit to be connected thereto, employing a conduit connector, in accordance with one or more aspects of the present invention;

FIG. 10B is a cross-sectional plan view of the apparatus of FIG. 10A taken through the conduit connector thereof, in accordance with one or more aspects of the present invention;

FIG. 10C depicts the cross-sectional plan view of FIG. 10B, with the conduit shown operatively, threadlessly secured within the conduit-receiving opening of the conduit connector, in accordance with one or more aspects of the present invention;

FIG. 10D is a cross-sectional plan view of an alternate embodiment of a conduit connector for a liquid manifold, in accordance with one or more aspects of the present invention;

DETAILED DESCRIPTION

Figure 1:
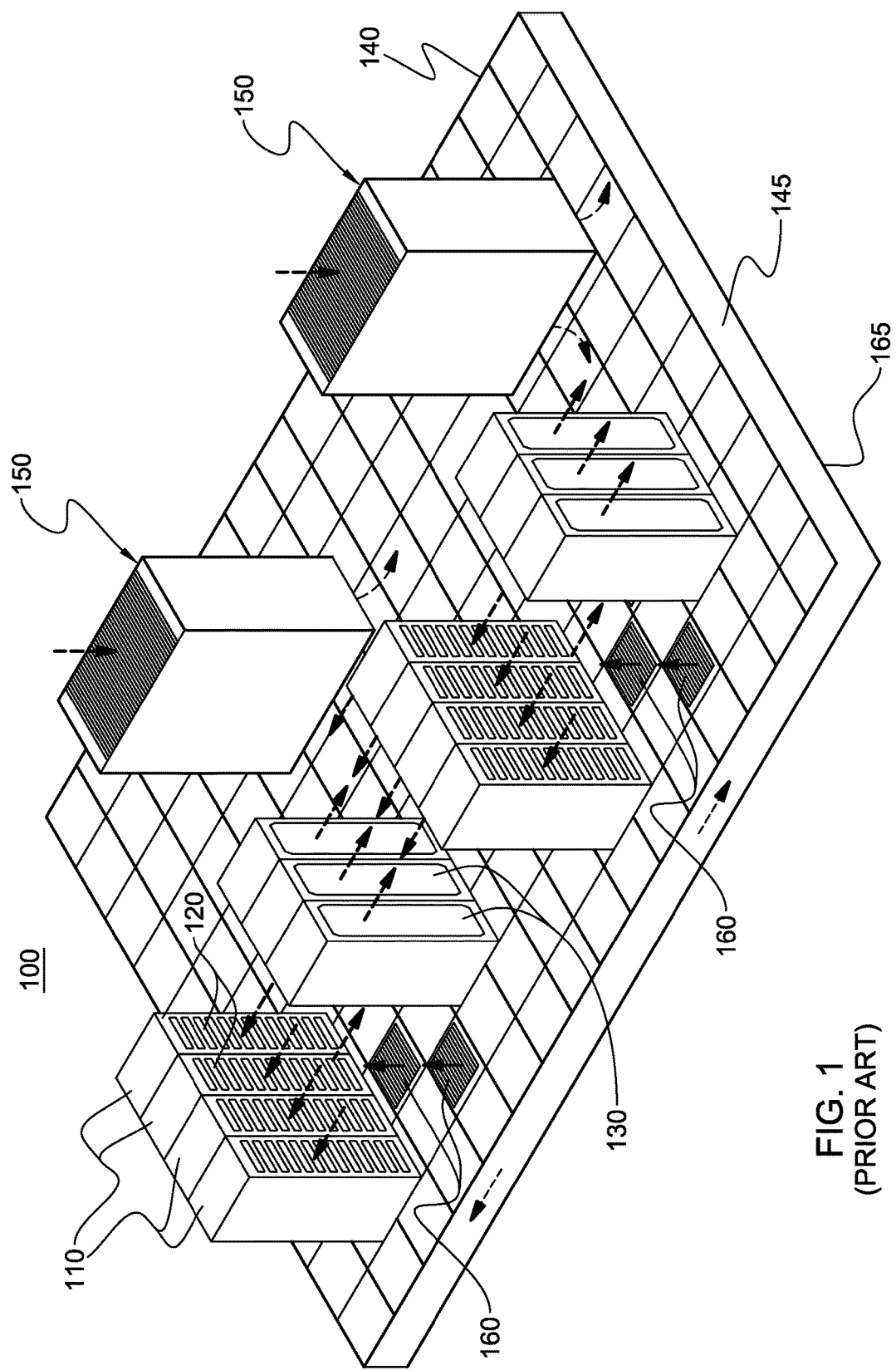
FIG. 1 depicts one embodiment of a conventional raised floor layout of an air-cooled data center.

Disclosed hereinbelow are various conduit connectors for facilitating coupling of a conduit (or tube) to, for instance, a liquid manifold or liquid-manifold assembly. The conduit connectors disclosed may be integrated with a variety of liquid manifolds. By way of example only, various liquid manifolds are described hereinbelow with reference to FIGS. 1-9C, where the liquid manifold may be part of a cooling apparatus, such as part of a coolant-cooled electronic module, or be detachably coupled to a coolant-cooled electronic module, to facilitate flow of liquid coolant through the module to remove heat generated within the module. Those skilled in the art will understand, however, that the conduit connectors disclosed may be integrated with various types of housings, for instance, at either an inlet or an outlet of the housing. Advantageously, the connectors disclosed hereinbelow with reference to FIGS. 10A-14B releasably, threadlessly secure a conduit to a liquid manifold in a torqueless manner, without hinges or flanges. Before discussing the systems of FIGS. 1A-9C, certain terms used herein are defined below.

As used herein, the terms "electronics rack", and "rack-mounted electronic equipment" are used interchangeably, and unless otherwise specified include any housing, frame, rack, compartment, blade server system, etc., having one or more heat-generating components of a computer system or electronics system, and may be, for example, a stand-alone computer processor having high, mid or low end processing capability. In one embodiment, an electronics rack may comprise one or more electronic subsystems. "Electronic subsystem" refers to any sub-housing, blade, book, drawer, node, compartment, etc., of (for example) an electronics rack having one or more heat-generating electronic components disposed therein or thereon. An electronic subsystem of an electronics rack may be movable or fixed relative to the electronics rack, with the rack-mounted electronics drawers of a multi-drawer rack unit and blades of a blade center system being two examples of subsystems of an electronics rack to be cooled. In one specific example, "electronic subsystem" refers to an electronic system which comprises multiple different types of electronic components, and may be, in one example, a server node of a multi-server rack.

"Electronic component" refers to any heat-generating electronic component of, for example, a computer system or other electronics unit requiring cooling. By way of example, an electronic component may comprise one or more integrated circuit dies and/or other electronic devices to be cooled, including one or more processor dies, memory dies and memory support dies. As a further example, an electronic component may comprise one or more bare dies or one or more packaged dies disposed on a common carrier. As used herein, "primary heat-generating component" refers to a primary heat-generating electronic component within an electronic subsystem, while "secondary heat-generating component" refers to an electronic component of the electronic subsystem generating less heat than the primary heat-generating component to be cooled. Further, unless otherwise specified herein, the terms "coolant-cooled structure" or "coolant-cooled cold plate" refer to a thermally conductive structure having one or more channels or passageways formed therein or thereon for flowing of coolant therethrough. In addition, "metallurgically bonded" refers generally herein to two components being welded, brazed or soldered together by any means.

As used herein, a "liquid-to-liquid heat exchanger" may comprise, for example, two or more coolant flow paths, formed of thermally conductive tubing (such as copper or other tubing) in thermal or mechanical contact with each other. Size, configuration and construction of the liquid-to-liquid heat exchanger can vary without departing from the scope of the invention disclosed herein. Further, "data center" refers to a computer installation containing one or more electronics racks to be cooled. As a specific example, a data center may include one or more rows of rack-mounted computing units, such as server units.

One example of a coolant (for example, the facility or system coolants discussed below) is water. However, the concepts disclosed herein are readily adapted to use with other types of coolant. For example, one or more of the coolants may comprise a glycol mixture, a brine, a fluorocarbon liquid, a liquid metal, or other similar coolant, or refrigerant, while still maintaining the advantages and unique features of the present invention.

Reference is made below to the drawings, which are not drawn to scale to facilitate understanding of the invention, wherein the same reference numbers used throughout different figures designate the same or similar components.

FIG. 1 depicts a raised floor layout of an air cooled data center 100 typical in the prior art, wherein multiple electronics racks 110 are disposed in one or more rows. A data center such as depicted in FIG. 1 may house several hundred, or even several thousand microprocessors. In the arrangement illustrated, cool air enters the data center via perforated floor tiles 160 from a cool air plenum 145 defined between the raised floor 140 and a base or sub-floor 165 of the room. Cool air is taken in through louvered covers at air inlet sides 120 of the electronics racks and expelled through the back (i.e., air outlet sides 130) of the electronics racks. Each electronics rack 110 may have one or more air moving devices (e.g., fans or blowers) to provide forced inlet-to-outlet airflow to cool the electronic devices within the subsystem(s) of the rack. The supply air plenum 145 provides conditioned and cooled air to the air-inlet sides of the electronics racks via perforated floor tiles 160 disposed in a "cold" aisle of the data center. The conditioned and cooled air is supplied to plenum 145 by one or more air-conditioning units 150, also disposed within the data center 100. Room air may be taken into one or more air-conditioning units 150 near the upper portions thereof. This room air may comprise, in part, exhausted air from the "hot" aisles of the computer installation defined, for example, by opposing air outlet sides 130 of electronics racks 110.

Due to the ever-increasing airflow requirements through electronics racks, and the limits of air distribution within the typical data center installation, coolant-assisted cooling is being combined with the conventional air-cooling. FIGS. 2-6 illustrate one embodiment of a data center implementation employing a coolant-assisted cooling system with one or more cold plates coupled to high heat-generating electronic components disposed within the electronics racks.

Figure 2:
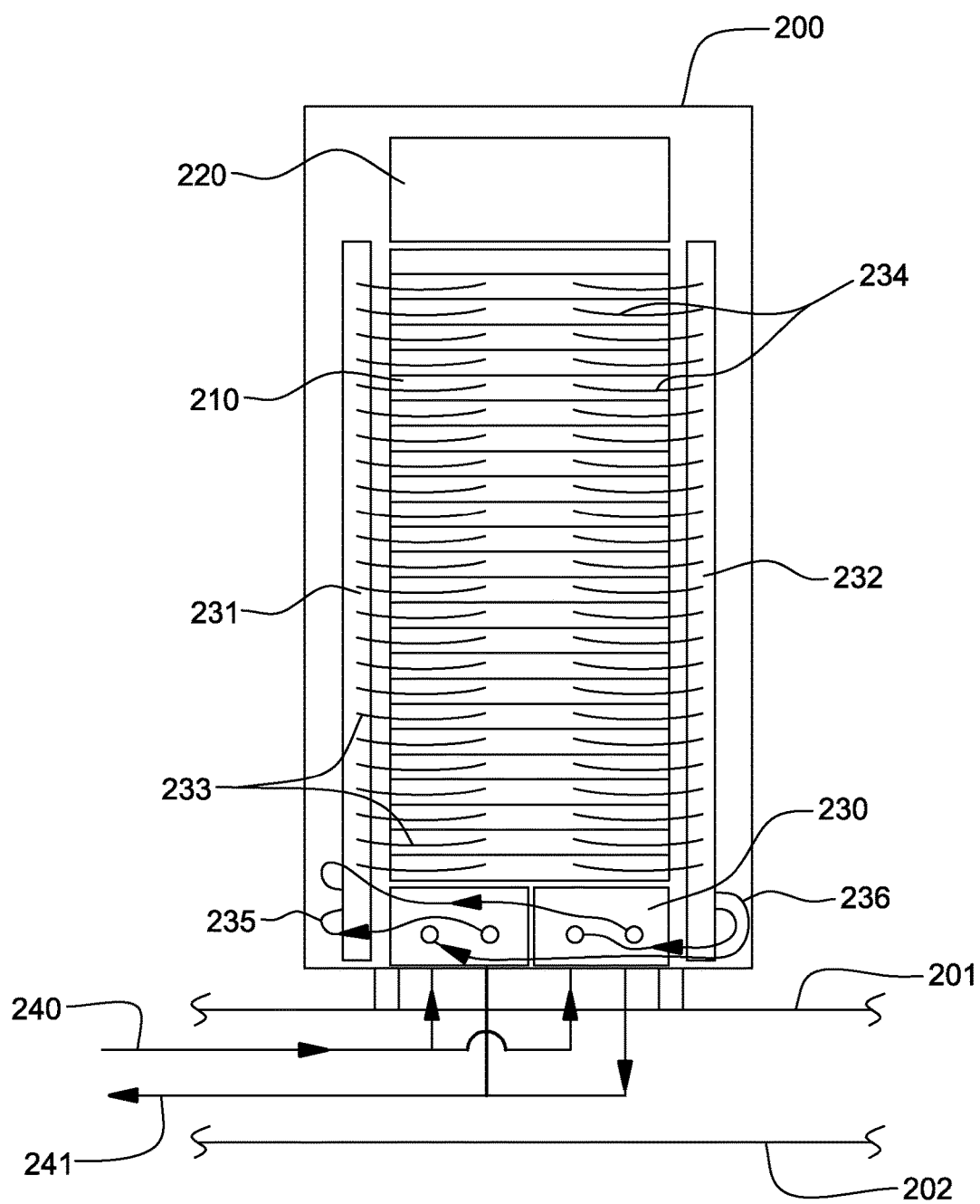
FIG. 2 is a front elevational view of one embodiment of an at least partially coolant-cooled electronics rack comprising multiple electronic subsystems and a cooling apparatus with one or more conduit connectors, in accordance with one or more aspects of the present invention.

FIG. 2 depicts one embodiment of a partially coolant-cooled electronics rack 200. As illustrated, coolant-cooled electronics rack 200 comprises a plurality of electronic subsystems 210, which may be processor or server nodes. A bulk power regulator 220 is shown disposed at an upper portion of liquid-cooled electronics rack 200, and two coolant conditioning units (CCUs) 230 are disposed in a lower portion of the liquid-cooled electronics rack. In certain embodiments described hereinbelow, the coolant is assumed to be water or an aqueous-based solution (by way of example only).

In addition to CCUs 230, the cooling system includes a system water supply manifold 231, a system water return manifold 232, and manifold-to-node fluid connect hoses 233 coupling system water supply manifold 231 to electronic subsystems 210, and node-to-manifold fluid connect hoses 234 coupling the individual electronic subsystems 210 to system water return manifold 232. Each CCU 230 is in fluid communication with system water supply manifold 231 via a respective system water supply hose 235, and each CCU 230 is in fluid communication with system water return manifold 232 via a respective system water return hose 236.

As illustrated, a portion of the heat load of the electronic subsystems is transferred from the system water to cooler facility water supplied by facility water supply line 240 and facility water return line 241 disposed, in the illustrated embodiment, in the space between a raised floor 201 and a base floor 202.

Figure 3:
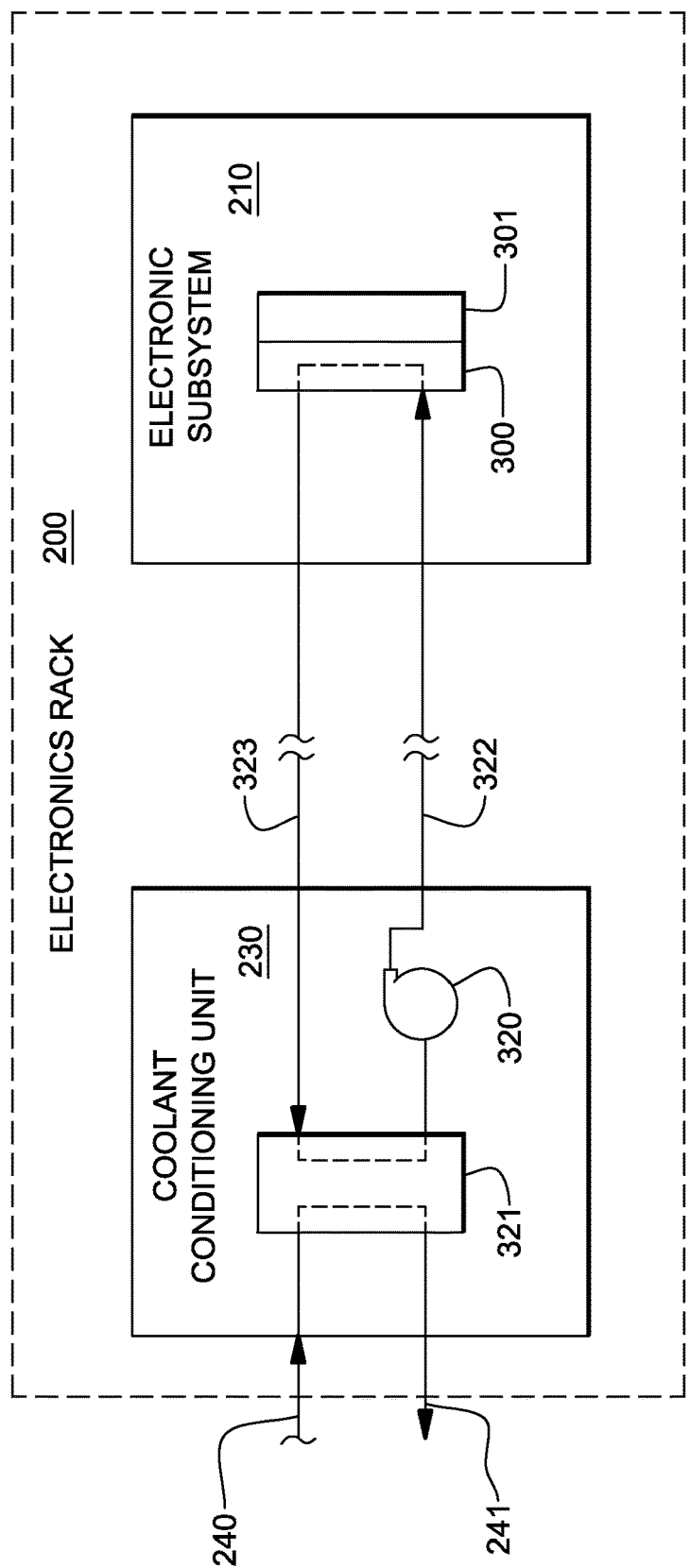
FIG. 3 is a schematic of one embodiment of an electronics rack, wherein an electronic module (or component) is coolant-cooled by system coolant (provided by one or more coolant conditioning units disposed within the electronics rack) passing through a coolant-cooled structure coupled to the electronic module, and within which one or more conduit connectors may be employed, in accordance with one or more aspects of the present invention.

FIG. 3 schematically illustrates operation of the cooling system of FIG. 2, wherein a liquid-cooled cold plate 300 is shown coupled to an electronic module 301 of an electronic subsystem 210 within the liquid-cooled electronics rack 200. Heat is removed from electronic module 301 via the system coolant circulated via pump 320 through cold plate 300 within the system coolant loop defined by liquid-to-liquid heat exchanger 321 of coolant conditioning unit 230, lines 322, 323 and cold plate 300. The system coolant loop and coolant conditioning unit are designed to provide coolant of a controlled temperature and pressure, as well as controlled chemistry and cleanliness to the electronic module(s). Furthermore, the system coolant is physically separate from the less controlled facility coolant in lines 240, 241, to which heat is ultimately transferred.

Figure 4:
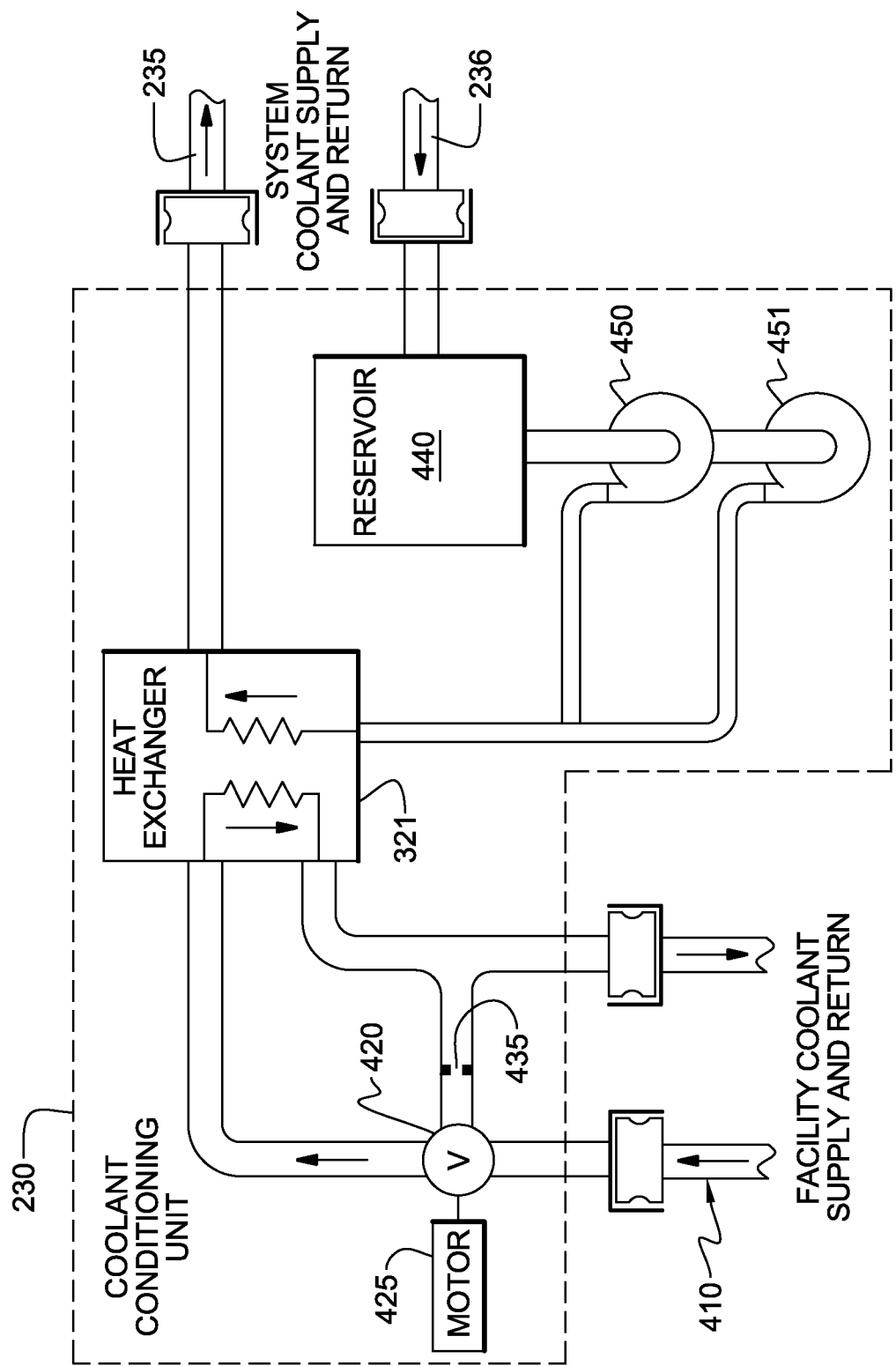
FIG. 4 is a schematic of one embodiment of a coolant conditioning unit disposed within a coolant-cooled electronics rack such as depicted in FIGS. 2 & 3, in accordance with one or more aspects of the present invention.

FIG. 4 depicts a more detailed embodiment of a coolant conditioning unit 230. As shown in FIG. 4, coolant conditioning unit 230 includes a first coolant loop wherein chilled, facility coolant is supplied 410 and passes through a control valve 420 driven by a motor 425. Valve 420 determines an amount of facility coolant to be passed through heat exchanger 321, with a portion of the facility coolant possibly being returned directly via a bypass orifice 435. The coolant conditioning unit further includes a second coolant loop with a reservoir tank 440 from which system coolant is pumped, either by pump 450 or pump 451, into the heat exchanger 321 for conditioning and output thereof, as cooled system coolant to the electronics rack to be cooled. The cooled system coolant is supplied to the system water supply manifold and returned from the system water return manifold of the liquid-cooled electronics rack via the system water supply hose 235 and system water return hose 236, respectively.

Figure 5:
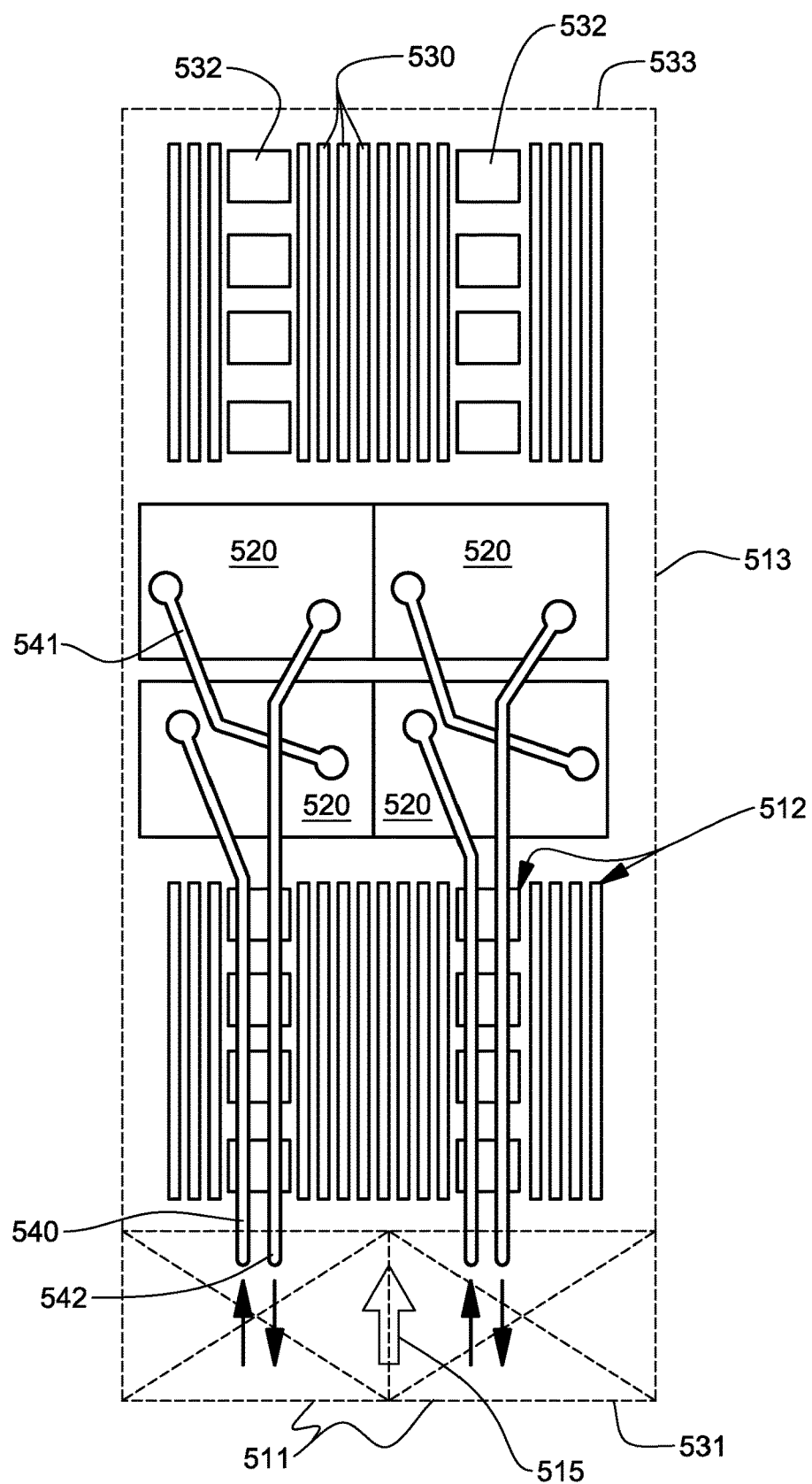
FIG. 5 is a plan view of one embodiment of an electronic subsystem layout illustrating a hybrid cooling system for cooling components of the electronic subsystem and within which one or more conduit connectors may be employed, in accordance with one or more aspects of the present invention.

FIG. 5 depicts one embodiment of an electronic subsystem 513 component layout wherein one or more air moving devices 511 provide forced air flow 515 to cool multiple components 512 within electronic subsystem 513. Cool air is taken in through a front 531 and exhausted out a back 533 of the drawer. The multiple components to be cooled include multiple processor modules to which liquid-cooled cold plates 520 (of a liquid-based cooling system) are coupled, as well as multiple arrays of memory modules 530 (e.g., dual in-line memory modules (DIMMs)) and multiple rows of memory support modules 532 (e.g., DIMM control modules) to which air-cooled heat sinks are coupled. In the embodiment illustrated, memory modules 530 and the memory support modules 532 are partially arrayed near front 531 of electronic subsystem 513, and partially arrayed near back 533 of electronic subsystem 513. Also, in the embodiment of FIG. 5, memory modules 530 and the memory support modules 532 are cooled by air flow 515 across the electronic subsystem.

The illustrated coolant-based cooling system further includes multiple coolant-carrying tubes connected to and in fluid communication with coolant-cooled cold plates 520. The coolant-carrying tubes comprise sets of coolant-carrying tubes, with each set including (for example) a coolant supply tube 540, a bridge tube 541 and a coolant return tube 542. In this example, each set of tubes provides coolant to a series-connected pair of cold plates 520 (coupled to a pair of processor modules). Coolant flows into a first cold plate of each pair via the coolant supply tube 540 and from the first cold plate to a second cold plate of the pair via bridge tube or line 541, which may or may not be thermally conductive. From the second cold plate of the pair, coolant is returned through the respective coolant return tube 542.

Figure 6:
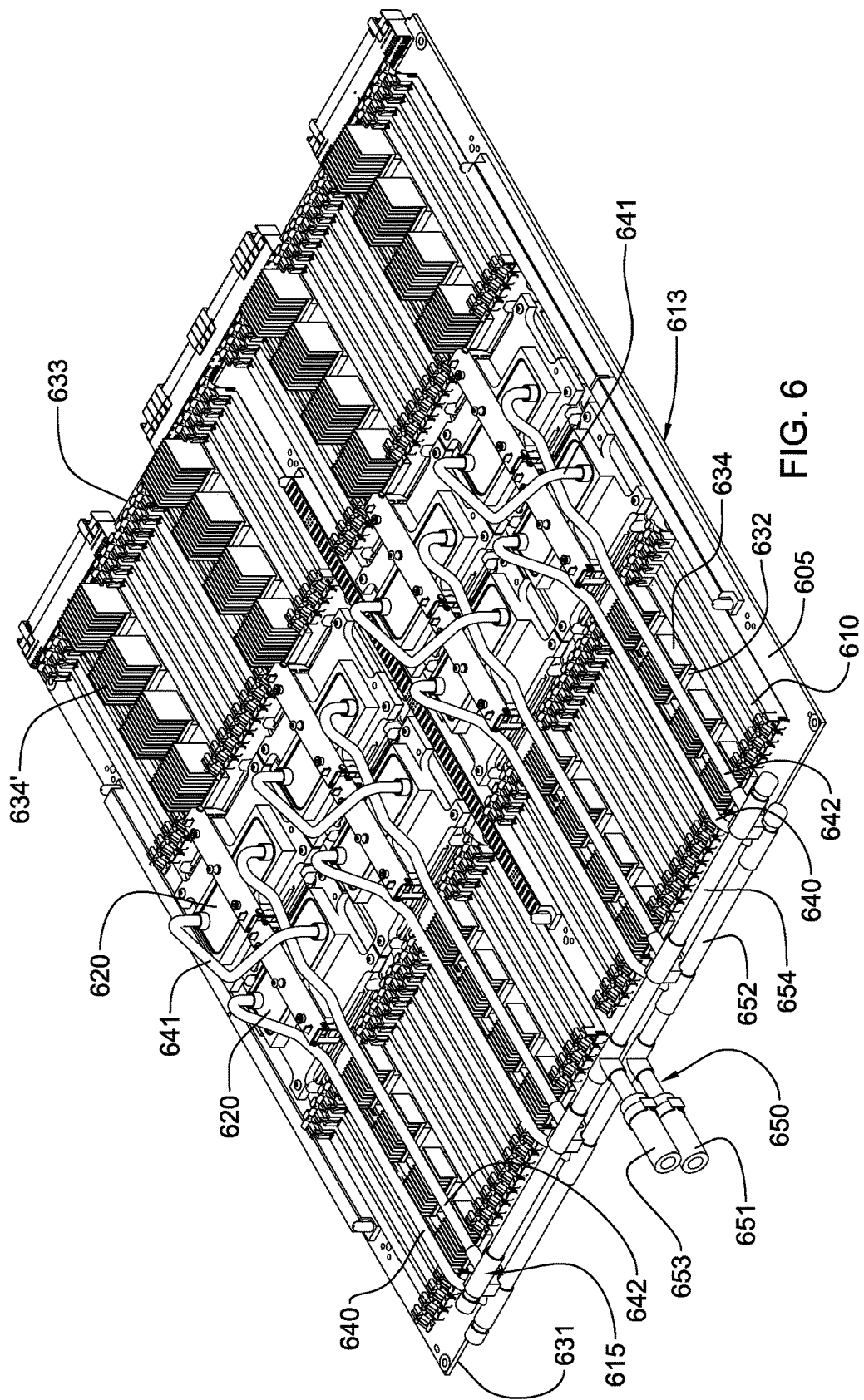
FIG. 6 depicts one detailed embodiment of a partially-assembled electronic subsystem layout, wherein the electronic subsystem includes, by way of example, eight heat-generating electronic components to be actively cooled, each having a respective coolant-cooled structure of a coolant-based cooling system coupled thereto and within which one or more conduit connectors may be employed, in accordance with one or more aspects of the present invention.

FIG. 6 depicts in greater detail an alternate electronics drawer layout comprising eight processor modules, each having a respective coolant-cooled cold plate of a coolant-based cooling system coupled thereto. The coolant-based cooling system is shown to further include associated coolant-carrying tubes for facilitating passage of liquid coolant through the coolant-cooled cold plates and a header subassembly to facilitate distribution of coolant to and return of coolant from the coolant-cooled cold plates. By way of specific example, the coolant passing through the coolant-based cooling subsystem is chilled water.

As noted, various coolants significantly outperform air in the task of removing heat from heat-generating electronic components of an electronic system, and thereby more effectively maintain the components at a desirable temperature for enhanced reliability and peak performance. As coolant-based cooling systems are designed and deployed, it is advantageous to architect systems which maximize reliability and minimize the potential for leaks while meeting all other mechanical, electrical and chemical requirements of a given electronic system implementation. These more robust cooling systems have unique problems in their assembly and implementation. For example, one assembly solution is to utilize multiple fittings within the electronic system, and use flexible plastic or rubber tubing to connect headers, cold plates, pumps and other components. In another approach, a robust coolant-assisted cooling system may be provided, specially preconfigured and prefabricated as a monolithic structure for positioning within a particular electronics drawer.

FIG. 6 is an isometric view of one embodiment of an electronics drawer and monolithic cooling system, in accordance with an aspect of the present invention. The depicted planar server assembly includes a multi-layer printed circuit board to which memory DIMM sockets and various electronic components to be cooled are attached both physically and electrically. In the cooling system depicted, a supply header is provided to distribute coolant from a single inlet to multiple parallel coolant flow paths and a return header collects exhausted coolant from the multiple parallel coolant flow paths into a single outlet. Each parallel coolant flow path includes one or more cold plates in series flow arrangement to cool one or more electronic components to which the cold plates are mechanically and thermally coupled. The number of parallel paths and the number of series-connected coolant-cooled cold plates depends, for example on the desired device temperature, available coolant temperature and coolant flow rate, and the total heat load being dissipated from each electronic component.

More particularly, FIG. 6 depicts a partially assembled electronic system 613 and an assembled coolant-based cooling system 615 coupled to primary heat-generating components (e.g., including processor dies) to be cooled. In this embodiment, the electronics system is configured for (or as) an electronics drawer of an electronics rack, and includes, by way of example, a support substrate or planar board 605, a plurality of memory module sockets 610 (with the memory modules (e.g., dual in-line memory modules) not shown), multiple rows of memory support modules 632 (each having coupled thereto an air-cooled heat sink 634), and multiple processor modules (not shown) disposed below the coolant-cooled cold plates 620 of the coolant-based cooling system 615.

In addition to coolant-cooled cold plates 620, coolant-based cooling system 615 includes multiple coolant-carrying tubes, including coolant supply tubes 640 and coolant return tubes 642 in fluid communication with respective coolant-cooled cold plates 620. The coolant-carrying tubes 640, 642 are also connected to a header (or manifold) subassembly 650 which facilitates distribution of coolant to the coolant supply tubes and return of coolant from the coolant return tubes 642. In this embodiment, the air-cooled heat sinks 634 coupled to memory support modules 632 closer to front 631 of electronics drawer 613 are shorter in height than the air-cooled heat sinks 634' coupled to memory support modules 632 near back 633 of electronics drawer 613. This size difference is to accommodate the coolant-carrying tubes 640, 642 since, in this embodiment, the header subassembly 650 is at the front 631 of the electronics drawer and the multiple liquid-cooled cold plates 620 are in the middle of the drawer.

Coolant-based cooling system 615 comprises a pre-configured monolithic structure which includes multiple (pre-assembled) coolant-cooled cold plates 620 configured and disposed in spaced relation to engage respective heat-generating electronic components. Each coolant-cooled cold plate 620 includes, in this embodiment, a coolant inlet and a coolant outlet, as well as an attachment subassembly (i.e., a cold plate/load arm assembly). Each attachment subassembly is employed to couple its respective coolant-cooled cold plate 620 to the associated electronic component to form the cold plate and electronic component assemblies. Alignment openings (i.e., thru-holes) are provided on the sides of the cold plate to receive alignment pins or positioning dowels during the assembly process. Additionally, connectors (or guide pins) are included within attachment the subassembly, which facilitate use of the attachment assembly.

As shown in FIG. 6, header subassembly 650 includes two manifolds, i.e., a coolant supply header 652 and a coolant return header 654, which in one embodiment, are coupled together via supporting brackets. In the monolithic cooling structure of FIG. 6, the coolant supply header 652 is metallurgically bonded in fluid communication to each coolant supply tube 640, while the coolant return header 654 is metallurgically bonded in fluid communication to each coolant return tube 642. A single coolant inlet 651 and a single coolant outlet 653 extend from the header subassembly for coupling to the electronics rack's coolant supply and return manifolds (not shown).

FIG. 6 also depicts one embodiment of the pre-configured, coolant-carrying tubes. In addition to coolant supply tubes 640 and coolant return tubes 642, bridge tubes or lines 641 are provided for coupling, for example, a coolant outlet of one coolant-cooled cold plate to the coolant inlet of another coolant-cooled cold plate to connect in series fluid flow the cold plates, with the pair of cold plates receiving and returning coolant via a respective set of coolant supply and return tubes. In one embodiment, the coolant supply tubes 640, bridge tubes 641 and coolant return tubes 642 are each pre-configured, semi-rigid tubes formed of a thermally conductive material, such as copper or aluminum, and the tubes are respectively brazed, soldered or welded in a fluid-tight manner to the header subassembly and/or the liquid-cooled cold plates. The tubes are pre-configured for a particular electronics system to facilitate installation of the monolithic structure in engaging relation with the electronics system.

The above-described cooling approach of FIGS. 2-6 is an effective solution for circulating water through coolant-cooled cold plates attached to heat-generating circuit modules (or components). An example of the efficacy of this approach is the IBM Power 575™ system offered by International Business Machines Corporation, Armonk, N.Y. In the embodiment of FIGS. 2-6, one or more coolant conditioning units containing a pump and, for example, a water-to-water heat exchanger, may be disposed within each electronics rack. As explained above, heat load carried by the system coolant circulating through the coolant-cooled components in the coolant-cooled electronics rack is rejected to facility chilled water passing through the second coolant path through the active water-to-water heat exchangers within the coolant conditioning units disposed within the rack units.

Figure 7A:
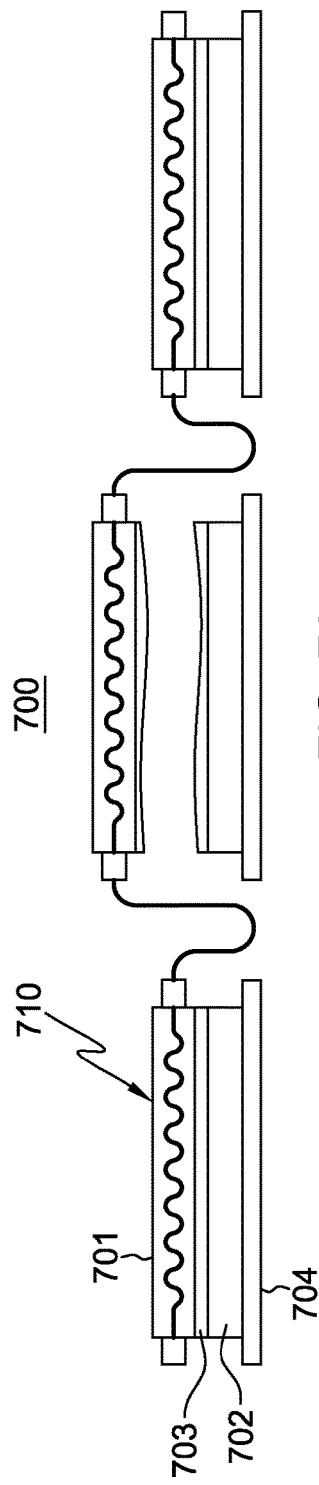
FIG. 7A is a schematic of one embodiment of a cooled electronic system comprising multiple conventional cooled electronic assemblies with multiple cold plates coupled via a thermal interface material to multiple electronic modules, wherein one cold plate is shown being detached from its electronic module for, for example, servicing or replacement of the electronic module.

Field-replaceability of cooling system components can be facilitated by providing cooling subassemblies that employ, for example, more flexible tubing interconnecting the coolant-cooled cold plates. One approach to such a subassembly 700 is depicted in FIG. 7A, wherein multiple cooled electronic assemblies 710 are depicted interconnected in fluid communication. In this approach, flexibility in the interconnect tubing allows for a particular coolant-cooled cold plate 701 to be decoupled at its interface with an electronic module 702 resident on, in this example, a substrate 704. Decoupling is facilitated by providing a thermal interface material 703, which allows for subsequent reworking of the cooled electronic assembly 710. By way of example, commonly assigned U.S. Letters Pat. No. 7,420,808 B2, depicts cooling subassemblies which comprise multiple cooled electronic assemblies, such as schematically depicted in FIG. 7A.

Figure 7B:
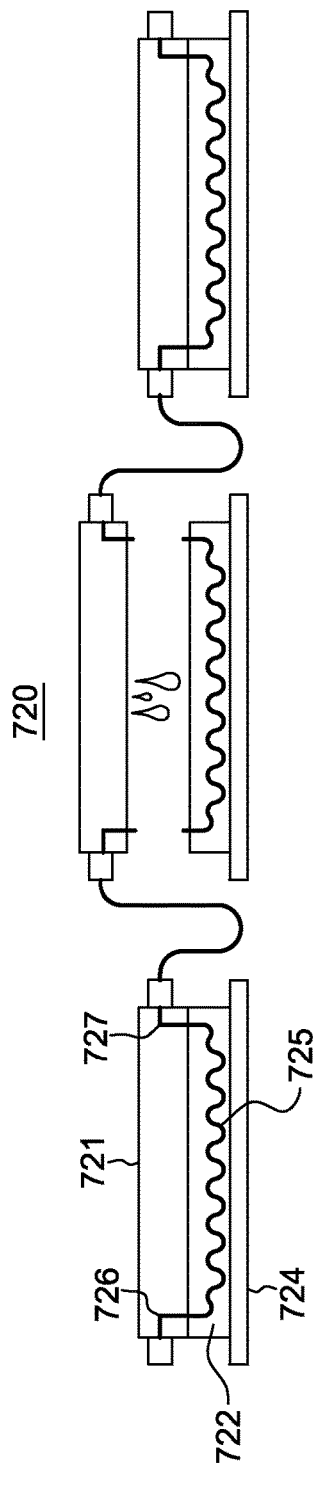
FIG. 7B is a schematic of an alternate embodiment of a cooled electronic system comprising multiple electronic assemblies with multiple coolant-cooled electronic modules and multiple coolant manifold structures detachably coupled thereto, within which one or more conduit connectors may be employed, in accordance with one or more aspects of the present invention.

FIG. 7B is a schematic of an alternate a cooling approach, wherein a coolant-cooled electronic subsystem 720 is illustrated comprising a coolant manifold structure 721 detachably coupled to a coolant-cooled electronic module 722. In the depicted embodiment, one or more coolant-carrying channels 725 are integrated within the coolant-cooled electronic module (or integrated electronic module) 722, so as to reside within the electronic module, for example, within an encapsulation of the module, or within a module lid enclosing one or more electronic components within the module. By way of example, the coolant-cooled electronic module is illustrated on a substrate 724. In the depicted embodiment, the coolant manifold structure 721 includes a coolant inlet 726 (which may comprise a coolant inlet manifold) and a coolant outlet 727 (which may comprise a coolant outlet manifold). Coolant inlet 726 and coolant outlet 727 are configured and disposed to be in fluid communication with the one or more coolant-carrying channels 725 of coolant-cooled electronic module 722 when the coolant manifold structure 721 is detachably coupled to the electronic module.

Advantageously, integrating one or more coolant channel(s) directly within the electronic module allows for enhanced heat transfer to coolant flowing through the cooled electronic assembly, since no thermal interface material is required between the coolant-cooled cold plate and the electronics module, thereby reducing the temperature difference between the coolant and the electronic module. However, an issue arises with detachability of the resultant assembly, particularly if detaching is to occur in the field. With detaching of such an assembly, there is the possibility of coolant contamination within the electronic system (illustrated in FIG. 7B). This coolant contamination may have different origins. In a drained coolant system, residual coolant could be trapped within the coolant lines or tubings, for example, interconnecting multiple cooled electronic assemblies, or in an un-drained system, coolant could escape from the coolant manifold structure, as well as from interconnect tubings or lines between electronic assemblies.

FIGS. 8A-8C illustrate an additional embodiment of a cooled electronic assembly, in accordance with one or more aspects of the present invention. In these embodiments, one or more coolant-carrying channels are again integrated within the electronic module itself, for example, within a liquid manifold configured as a module lid (or within an encapsulant) in direct contact with one or more electronic components (such as one or more integrated circuit die or chips), or may be formed integral with the electronic component(s) so as to be disposed within the resultant module.

Referring collectively to FIGS. 8A-8C, cooled electronic assembly 800 is shown to include a coolant-cooled electronic module 810, residing on a substrate 811, and a coolant manifold structure 820 detachably coupled to coolant-cooled electronic module 810 via, for example, multiple fasteners 830 at the corners of the electronic assembly 800. Coolant-cooled electronic module 810 comprises one or more electronic components within the module, as well as one or more coolant-carrying channels, with multiple channels being employed in the embodiment of FIGS. 8A-8C. The multiple channels have multiple heat exchanger inlets 812 and outlets 813 formed within module lid 814 of the coolant-cooled electronic module 810. Detachable coolant manifold structure 820 comprises, in this example, a coolant inlet 821 and a coolant outlet 822, which are designed (in one embodiment) as a coolant inlet manifold and coolant outlet manifold, respectively. The coolant inlet and coolant outlet of the manifold are configured and positioned to align over the coolant inlets 812 and outlets 813 of the heat exchanger within the coolant-cooled electronic module 810 Inner containment rings (or O-rings) 823, 824, may be provided within coolant manifold structure 820 to facilitate a fluid-tight coupling of the coolant manifold structure 820 to the integrated electronic module 810 at the interface between the manifold structure and module. Tubing 841, 842 couples to the coolant manifold structure 820 in fluid communication with the coolant inlet manifold and coolant outlet manifold to facilitate the flow of coolant through the coolant-carrying channels of the coolant-cooled electronic module 810.

As noted, one issue addressed herein is mitigating possible coolant contamination of an electronic system with decoupling of a coolant manifold structure of a cooled electronic assembly (such as described hereinabove) in place, for example, within an operating electronic subsystem of an electronics rack. Field replacability of a cooled electronic assembly, or more particularly, the coolant-cooled electronic module of such an assembly, provides significant cost savings and convenience advantages compared with, for example, shutting an electronic subsystem down, and returning the subsystem to a manufacturer for replacement of a module. There are multiple approaches to field replacability of an assembly or a coolant-cooled electronic module such as described herein. An example is described below with reference to FIGS. 9A & 9B.

Figure 9A:
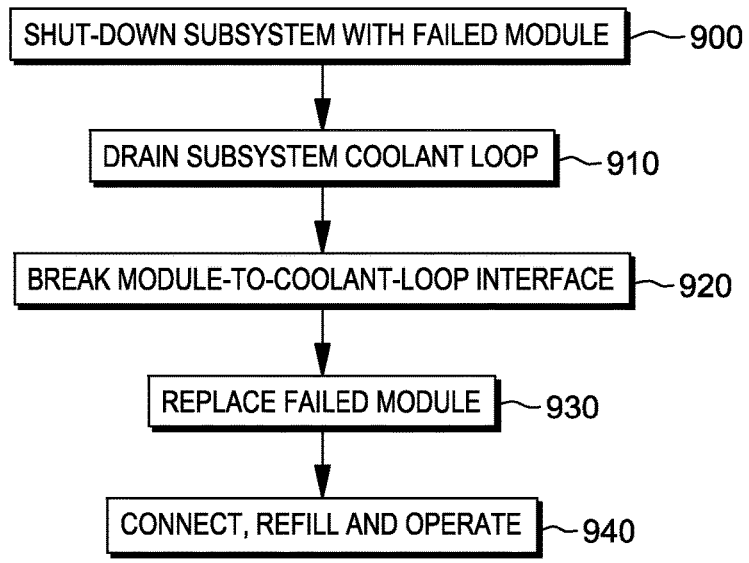
FIG. 9A depicts one embodiment of a process for decoupling a coolant-cooled electronic module and a liquid manifold of a cooled electronic assembly within a coolant-cooled electronic subsystem, in accordance with one or more aspects of the present invention.
Figure 9B:
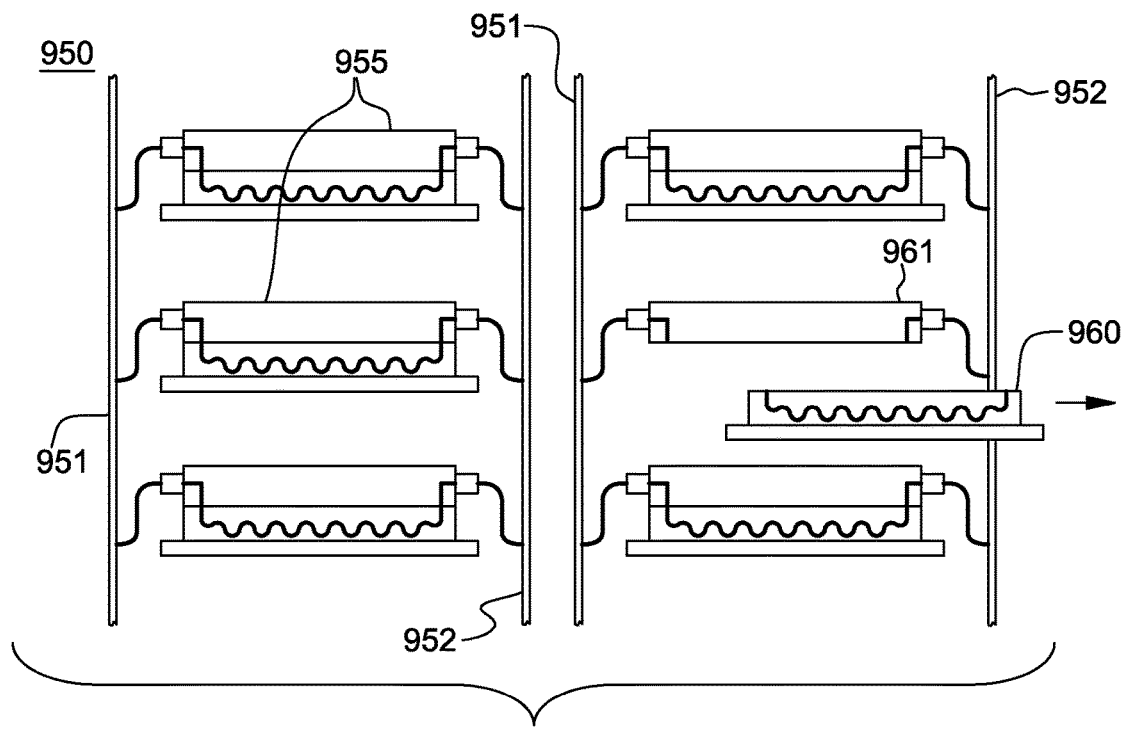
FIG. 9B illustrates decoupling of a coolant-cooled electronic module from a liquid manifold, for example, pursuant to the process of FIG. 9A, in accordance with one or more aspects of the present invention.

FIGS. 9A & 9B illustrate one approach to field replaceability in a cooled electronic system where there are no fluid-valves coupling the coolant manifold structures to the subsystem coolant loop. By way of example, such a system may employ rigid or semi-rigid tubing coupling the coolant manifold structures in substantially fixed positions within the electronic system. This is illustrated in FIG. 9B, where multiple cooled electronic assemblies 955 are shown in position in fluid communication with a subsystem-level coolant inlet manifold 951 and a subsystem-level coolant outlet manifold 952 (by way of example only). As illustrated in this figure, one coolant-cooled electronic module 960 being decoupled (for example, for field-replacing thereof) from its associated coolant manifold structure 961.

Referring to the exchange process of FIG. 9A, a coolant-cooled electronic module may be replaced by shutting down the subsystem (or board) with the electronic module to be replaced 900, and draining the tubing of the subsystem (or board) coolant loop 910. Optionally, the tubing of the subsystem coolant loop may be flushed with air to remove the coolant. Thereafter, the module-to-coolant loop interface may be broken 920 by detaching the coolant-cooled electronic module from its associated coolant manifold structure (see FIG. 9B). The detached coolant-cooled electronic module may then be replaced 930. By draining the subsystem coolant loop prior to decoupling the coolant-cooled electronic module from its coolant manifold structure, discharge of coolant onto, for example, the associated electronic board or other components of the electronic system or subsystem is reduced, or even eliminated. A new coolant-cooled electronic module may then be connected to the coolant manifold structure remaining coupled within the cooled electronic subsystem, after which the subsystem coolant loop is refilled to allow for operation of the cooled electronic system 940.

Figure 9C:
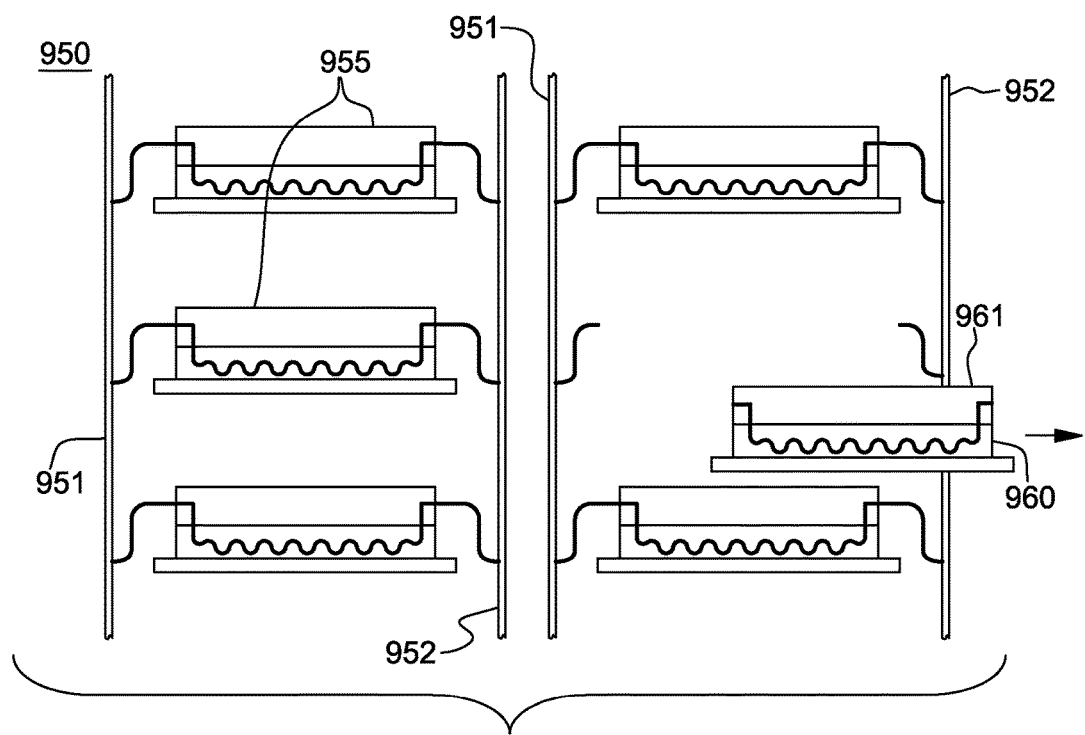
FIG. 9C illustrates decoupling of a cooled electronic assembly from a coolant-cooled electronic subsystem using one or more conduit connectors, in accordance with one or more aspects of the present invention.

In FIG. 9C, an alternate approach to field replaceability of a cooled electronic system is depicted, wherein tubing is provided coupling the coolant manifold structures to subsystem-level coolant inlet manifold 951 and subsystem-level coolant outlet manifold 952. As illustrated in this figure, one coolant-cooled electronic module 960 and the associated coolant manifold structure 961 are coupled together and may be readily released to withdraw the subassembly from the associated conduits using, for instance, conduit connectors such as described hereinbelow. More generally, enhanced conduit connectors which may be employed, for instance, in connection with one or more of the liquid-cooled manifolds or manifold assemblies of FIGS. 2-9C are described below with reference to FIGS. 10A-14B.

Generally stated, disclosed hereinbelow are various conduit connectors for facilitating coupling of a conduit (or tube) to, for instance, a liquid manifold, such as the above-described coolant manifold structure 961 of FIGS. 9B & 9C. Note, however, that the conduit connectors disclosed herein may be employed in a variety of different types of liquid manifolds (or liquid-manifold assemblies), including coolant manifold assemblies, and non-coolant manifold assemblies. In the embodiments disclosed herein, the conduit connectors are integrated, at least in part, within the liquid manifold, for instance, at one or both of a liquid inlet or outlet to the liquid manifold. In the embodiments disclosed, the conduit connectors advantageously releasably, threadlessly secure the conduit within the liquid manifold in a torque-less manner, without hinges or flanges.

FIGS. 10A-10C depict one embodiment of an apparatus 1000 comprising a liquid manifold 1010 and a conduit connector 1020, in accordance with one or more aspects of the present invention.

As illustrated in FIG. 10A, conduit connector 1020 includes a conduit-receiving opening 1021 within liquid manifold 1010 in fluid communication with at least one liquid-carrying channel 1012 (see FIGS. 10B & 10C) of liquid manifold 1010. In the illustrated embodiment, conduit-receiving opening 1021 is disposed at an upper corner of the liquid manifold so as to be partially open or exposed vertically, at an upper surface 1011 of liquid manifold 1010, as well as laterally at a side wall 1013 (see FIGS. 10B & 10C). This particular design of a partially-vertically-open, conduit-receiving opening 1021 facilitates, in certain embodiments, manufacturing of the conduit connector integral with the liquid manifold. For example, the liquid manifold with the herein noted conduit connector features may be injection-molded using, in part, retractable inserts, to prevent polymer molding in the desired open spaces of the assembly. Retraction of these inserts may be facilitated by providing the conduit connector at a corner of the liquid manifold, as illustrated in the embodiments of FIGS. 10A-10C. Note that in other embodiments, conduit-receiving opening 1021 may be disposed further down a side of liquid manifold 1010, so as not to be exposed at upper surface 1011 of liquid manifold 1010. In addition, liquid manifold 1010 with the integrated conduit connector may be formed by other manufacturing techniques, as well as other materials. The conduit-receiving opening comprises, in one embodiment, an opening formed within liquid manifold 1010 to accommodate an end portion of a conduit 1030 in a fluid-tight manner within liquid manifold 1010 and in fluid communication with the liquid-carrying channel 1012 of liquid manifold 1010.

Conduit connector 1020 further includes one or more releasable retention components disposed at least partially within liquid manifold 1010 when conduit 1030 is operatively threadlessly secured within the conduit-receiving opening 1021. In the embodiment of FIGS. 10A-10C, the releasable retention component(s) may include one or more releasable retention arms 1025 integrated with liquid manifold 1010 and extending into conduit-receiving opening 1021 to physically engage the conduit 1030 when conduit 1030 is positioned within conduit-receiving opening 1021. As illustrated, in one embodiment, the releasable retention arms 1025 are formed integral with liquid manifold 1010, for example, as the result of an injection molding process. Releasable retention arms 1025 are spaced from the inner wall of conduit-receiving opening 1021 (for example) to allow for, in part, bending of releasable retention arms 1025 outwards as conduit 1030 is being inserted into or removed from conduit-receiving opening 1021. In the depicted embodiment, two retention arms are illustrated, engaging opposite sides of conduit 1030 when threadlessly secured within conduit-receiving opening 1021. In an alternate implementation, more than two releasable retention arms may be employed as part of the conduit connector. Additionally, as noted further below, configuration of the releasable retention arm(s) may vary between implementations, or even within a single implementation. For instance, one or more of the releasable retention arms may be curved, with a radius of curvature similar to that of conduit 1030 to be releasably, threadlessly secured within the conduit connector.

By way of example, one or more of the releasable retention arms 1025 may include one or more inwardly-extending raised features 1026, such as snap-in features, including hooks or barbs, to facilitate engaging and holding conduit 1030 when positioned within conduit-receiving opening 1021 of conduit connector 1020.

In the embodiment of FIGS. 10A-10C, conduit 1030 is provided or configured with a circumferential notch 1031 (or shoulder), sized and positioned to allow for the inwardly-extending raised features 1026 of releasable retention arms 1025 to securely engage and hold conduit 1030 in fixed position within conduit-receiving opening 1021 when operatively positioned within the conduit-receiving opening in a fluid-tight manner. For instance, conduit 1030 could be formed as a monolithic structure to have the configuration of FIGS. 10A-10C. Alternatively, a ring or other structure could be secured to the outer periphery of the conduit to achieve the illustrated configuration with circumferential notch 1031; for example, by adhering or press-fitting a ring or other structure over the conduit. Note that the releasable retention component(s) of conduit connector 1020, such as the releasable retention arms 1025, threadlessly secure conduit 1030 within conduit-receiving opening 1021 in a releasable manner. This releasability, as well as the insertion of conduit 1030 into conduit-receiving opening 1021 may be enhanced by extending releasable retention arms 1025 slightly outwards past side wall 1013 of liquid manifold 1010 to allow for easy manipulation of the releasable retention arms 1025 during insertion or removal of conduit 1030 from conduit-receiving opening 1021.

As illustrated in FIGS. 10B & 10C, conduit-receiving opening 1021 has, in the depicted embodiment, an extended cavity portion 1022, which is covered by upper surface 1011 and accommodates conduit end 1032 within liquid manifold 1010 in fluid communication with liquid-carrying channel 1012 of liquid manifold 1010. Note that the covering of extended cavity portion 1022 by upper surface 1011 facilitates sealing of conduit 1030 within conduit-receiving opening 1021. As noted, in one implementation, extended cavity portion 1022 of conduit-receiving opening 1021, and the partial exposure of conduit-receiving opening 1021 at upper surface 1011 of liquid manifold 1010 facilitates manufacturing by injection-molding the liquid manifold with the conduit-receiving opening therein. Thus, in the depicted implementation, the conduit-receiving opening is exposed in multiple directions or sides of the manifold.

As illustrated in FIGS. 10B & 10C, conduit connector 1020 further includes, in one embodiment, at least one radial-sealing ring 1023, and at least one facial-sealing ring 1024, which may reside in respective channels formed in liquid manifold 1010 to hold the sealing rings in position. The radial-sealing ring 1023 engages an outer periphery of conduit 1030, as illustrated in FIG. 10C, with conduit 1030 threadlessly secured within conduit-receiving opening 1021, and the facial-sealing ring(s) engages an end of conduit 1030 with threadless securing of conduit 1030 within conduit-receiving opening 1021. As shown in FIG. 10C, when threadlessly secured in a fluid-tight manner within the conduit-receiving opening, the inner channel of conduit 1030 aligns (in one embodiment) to liquid-carrying channel(s) 1012 of liquid manifold 1010.

Figure 10E:
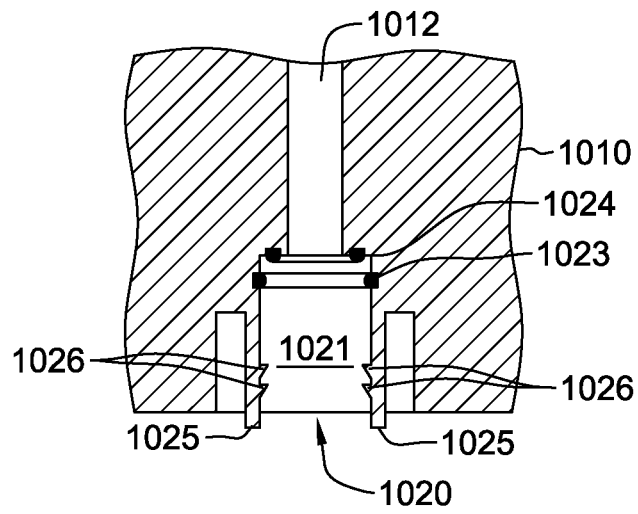
FIG. 10E is a cross-sectional plan view of a further alternate embodiment of a conduit connector for a liquid manifold, in accordance with one or more aspects of the present invention.

FIG. 10D depicts an alternate embodiment of a conduit connector integrated, at least in part, within liquid manifold 1010. The depicted conduit connector is analogous to the above-described conduit connector 1020 of FIGS. 10A-10C, with a few modifications. For instance, one or more releasable retention arms 1025' are integrated within liquid manifold 1010 so as to extend into conduit-receiving opening 1023, but not extend out past sidewall 1013 of liquid manifold 1010. In this implementation, releasable retention arms 1025' again include inwardly-extending raised features 1026 configured to engage conduit 1030' when the conduit is positioned within the conduit-receiving opening 1021, as illustrated in FIG. 10D. Conduit 1030' includes corresponding notches 1031, which latch or lock against the inwardly-extending raised features 1026 of releasable retention arms 1025' with insertion of the conduit into the opening. This latching or locking aspect can be facilitated using, for instance, a thermal forming process, or other shape-changing process, to modify conduit 1030' into the desired configuration at its end portion 1032', that is, at the portion of the conduit to be threadlessly secured within conduit-receiving opening 1021. As a further variation, in the conduit connector implementation of FIGS. 10D-10E, the conduit-receiving opening 1021 includes an extended cavity portion within liquid manifold 1010 which aligns with inward-facing surfaces of releasable retention arms 1025', as illustrated.

FIG. 10E depicts an alternate embodiment of conduit connector 1020 of FIGS. 10A-10C, wherein multiple inwardly-extending raised features 1026 are provided on one or more of the releasable retention arms 1025. As noted, these raised features may comprise hooks, barbs, etc., intended to physically engage a periphery of the conduit when the conduit is operatively, threadlessly secured in a fluid-tight manner within the conduit-receiving opening or socket. Note also that the inwardly-extending raised features may by design be recessed or stand out, that is, may be exposed, within the conduit-receiving opening 1021 formed in liquid manifold 1010.

Figure 10F:
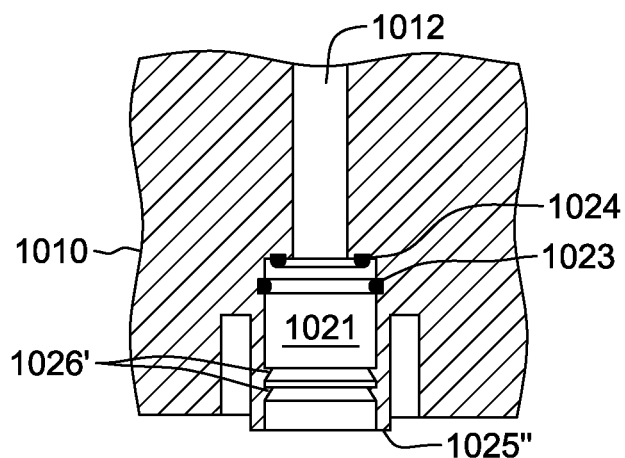
FIG. 10F is a cross-sectional plan view of another alternate embodiment of a conduit connector for a liquid manifold, in accordance with one or more aspects of the present invention.

Alternatively, as illustrated in FIG. 10F, one or more releasable retention arms 1025" may be provided that are at least partially curved to at least partially wrap around the conduit to be threadlessly received, and one or more inwardly-extending raised features 1026' may be at least partially circumferentially provided around the inner surface(s) of such releasable retention arm(s) 1025", as shown.

Figure 11A:
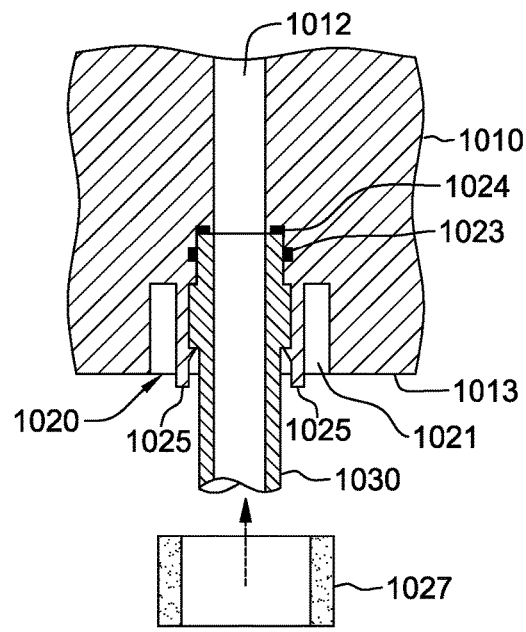
FIG. 11A is a cross-sectional plan view of the apparatus of FIG. 10C, with a retention ring of the conduit connector shown being inserted into position, in accordance with one or more aspects of the present invention.
Figure 11B:
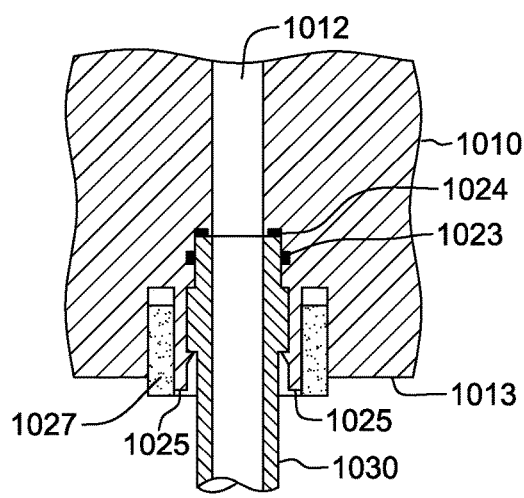
FIG. 11B depicts the apparatus of FIG. 11A, with the retention ring shown operatively positioned within, at least in part, the liquid manifold, in accordance with one or more aspects of the present invention.
Figure 11C:
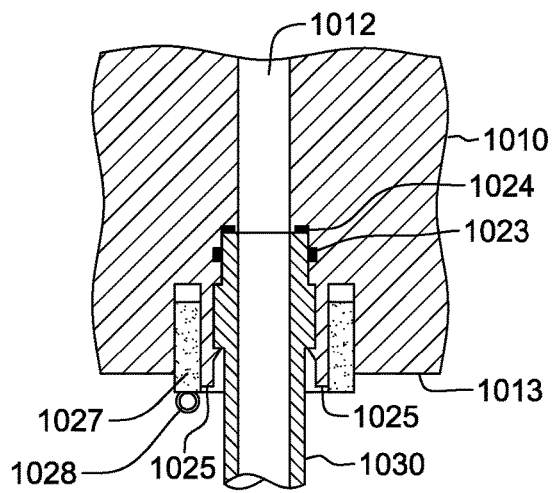
FIG. 11C depicts the apparatus of FIG. 11B, with an alternate embodiment of the retention ring shown operatively positioned within the liquid manifold, in accordance with one or more aspects of the present invention.

As illustrated in FIGS. 11A & 11B, the one or more releasable retention components of conduit connector 1020 may (in certain embodiments) comprise different types of releasable retention components designed to operatively, threadlessly secure a conduit 1030 within conduit-receiving opening 1021 in fluid communication with liquid-carrying channel 1012 of liquid manifold 1010 to facilitate flow of liquid through the manifold. These multiple different types of releasable retention components may include one or more of the above-described releasable retention arms 1025, 1025', 1025", as well as, for instance, one or more retention ring(s) 1027 configured to encircle, at least in part, a portion of conduit 1030 when positioned within conduit-receiving opening 1021 to facilitate threadless securing of the conduit within the conduit-receiving opening, and thus, provide redundant types of releasable retention of the conduit within the opening or socket. In this implementation, conduit-receiving opening 1021 is sized and shaped to accommodate retention ring 1027 in a manner illustrated in FIG. 11B, with the retention ring disposed, at least in part, for instance, substantially, within conduit-receiving opening 1021.

In the depicted implementation, retention ring 1027 is sized to also encircle the releasable retention arm(s) physically engaging conduit 1030. In one embodiment, the retention ring is at least partially compressible to apply a compressive force against the releasable retention arm(s) 1025 and conduit 1030 when operatively positioned within conduit-receiving opening 1021, as illustrated. The retention ring(s) thus advantageously facilitates threadless securing or latching of the other retention features, such as inwardly-extending raised features 1026 of the releasable retention arm(s) and notches 1031 of conduit 1030, in place. Note that, depending upon the nature of conduit 1030, for instance, whether fabricated of a higher-modulus material, such as metal, or a lower-modulus material, such as polymer, inwardly-extending raised features 1025 physically engage and possibly deform the outer periphery of conduit 1030 to facilitate further threadless securement of the conduit within the conduit-receiving opening. Thus, the retention ring is designed to at least one of secure the inwardly-extending raised features, if present, of the releasable retention arms in place at a conduit notch, and/or to facilitate biting of the inwardly-extending raised features into the conduit by (in part) appropriately selecting the material composition and sizing of retention ring 1027. In one or more implementations, retention ring 1027 may include one or more gripping features 1028 designed to facilitate selective removal of retention ring(s) 1027 from operative position within conduit-receiving opening 1021 of the conduit connector, for instance, to facilitate a withdrawal of the conduit from the conduit-receiving opening.

Figure 12A:
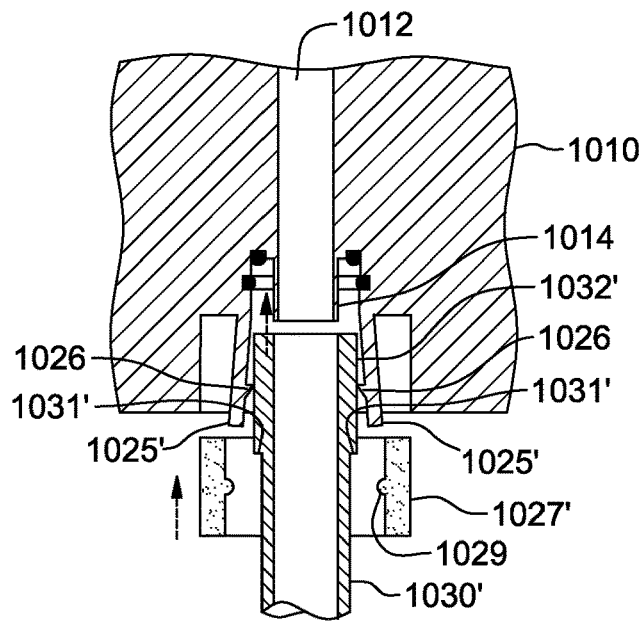
FIG. 12A is a cross-sectional plan view of a further embodiment of a conduit connector and liquid manifold, in accordance with one or more aspects of the present invention.

FIG. 12A depicts operative insertion of a conduit 1030' into the conduit-receiving opening 1021 of the conduit connector, with an alternate embodiment of retention ring 1027' depicted. In this embodiment, the retention ring 1027' includes at least one inner circumferential protrusion 1029, configured and positioned to facilitate applying a holding force to the conduit, either directly or indirectly, via the releasable retention arm(s), when the conduit and the retention ring 1027' are positioned within the conduit-receiving opening 1021 of the conduit connector. Further, as illustrated in FIG. 12A, a tubular insert 1014 may be provided integral with liquid manifold 1010 which is sized to extend into the inner channel of conduit 1030' when the conduit is threadlessly secured within the conduit-receiving opening. In an alternate implementation, tubular insert 1014' (FIG. 12B) may extend further into conduit 1030' when operatively positioned and secured in place by the conduit connector. By way of further detail, FIG. 12C is a side elevational view of the apparatus embodiment of FIG. 12B, including the liquid manifold, conduit connector and conduit, threadlessly secured in position within the conduit-receiving opening.

Figure 12D:
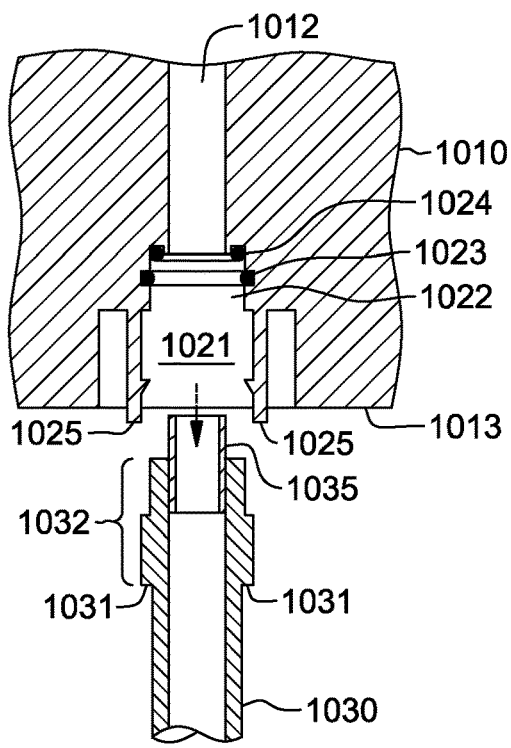
FIG. 12D depicts an alternate embodiment of the apparatus of FIG. 12A, in accordance with one or more aspects of the present invention.
Figure 12B:
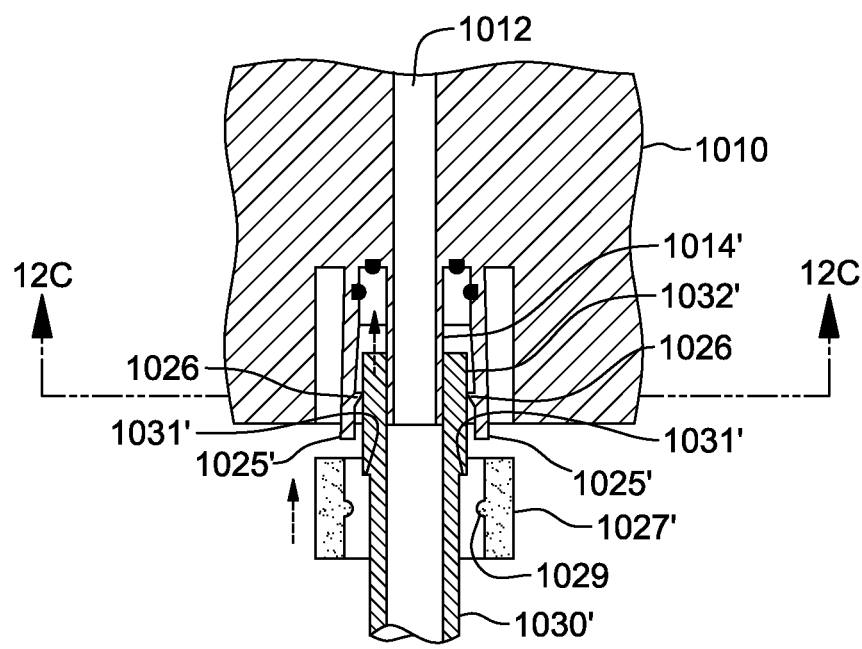
FIG. 12B depicts another alternate embodiment of the apparatus of FIG. 12A, in accordance with one or more aspects of the present invention.
Figure 12C:
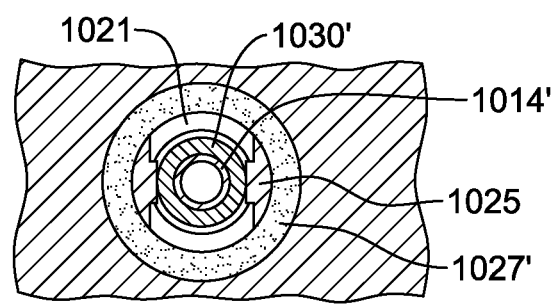
FIG. 12C is a side elevational view of the apparatus of FIG. 12B, taken along line 12C-12C thereof, in accordance with one or more aspects of the present invention.

FIG. 12D depicts an alternate embodiment, wherein a separate tubular insert 1035 is provided disposed at least in part within conduit 1030. Note that in this example, the conduit connector 1020 and conduit 1030 are configured similar to that described above in connection with FIGS. 10A-10C. Tubular insert 1035 may be a rigid insert component designed to provide rigidity to conduit 1030 in the region where the releasable retention arm(s) and/or retention ring (not shown) physically engage the conduit to threadlessly hold or secure the conduit within the conduit-receiving opening. Tubular insert 1035 may be particularly advantageous where the conduit is formed of a low-modulus material, and in one embodiment, may be designed to also extend into liquid-carrying channel 1012 when the conduit is secured within the opening.

FIGS. 13A-13E depict further alternate embodiments of a conduit connector such as described above.

Figure 13A:
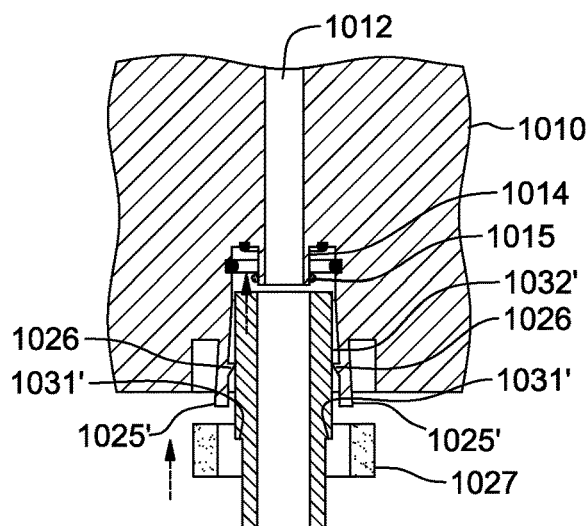
FIG. 13A is a cross-sectional plan view of a further embodiment of a conduit connector and liquid manifold, in accordance with one or more aspects of the present invention.
Figure 13B:
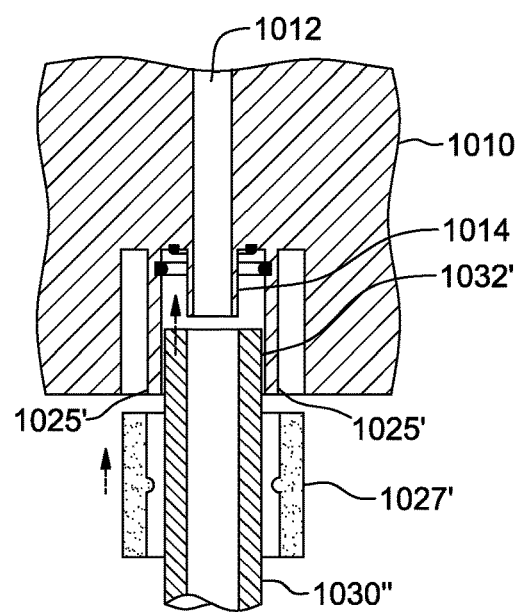
FIG. 13B is an alternate embodiment of the conduit connector of the apparatus of FIG. 13A, in accordance with one or more aspects of the present invention.
Figure 13C:
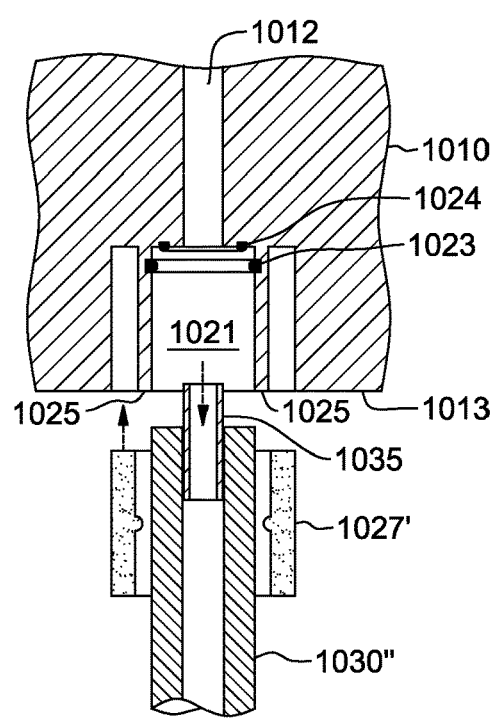
FIG. 13C is a further alternate embodiment of the conduit connector of FIG. 13A, in accordance with one or more aspects of the present invention.

In FIG. 13A, the tubular insert 1014 is again provided integral with liquid manifold 1010, and is sized and positioned to extend into the inner channel of conduit 1030' with operative positioning of the conduit within the conduit-receiving opening, for instance, to further ensure a fluid-tight sealing of the conduit to the liquid manifold and, depending upon the implementation, to provide additional rigidity to conduit 1030' when threadlessly secured within the conduit-receiving opening by the releasable retention component(s) (which in one embodiment, may include one or more releasable retention arms 1025', and/or a retention ring 1027). As shown in FIG. 13A, in one embodiment, an outer circumferential protrusion 1015 may be provided on tubular insert 1014 sized and positioned to engage an inner wall of the inner channel of conduit 1030' with positioning of the conduit within the conduit-receiving openings, for instance, to assist in fluid-tight sealing of the conduit to the manifold FIGS. 13B & 13C depict further conduit connector variations. In these embodiments, the one or more inwardly-extending raised features of the releasable retention arm(s) are removed, and the one or more retention arms 1025 are positioned to slidably receive a conduit 1030" into conduit-receiving opening 1021. Additional rigidity to conduit 1030" may be provided via an appropriately sized tubular insert 1014 extending from liquid manifold 1010 into the inner channel of conduit 1030" with operative positioning of the conduit within the conduit-receiving opening 1021. In FIG. 13C, tubular insert 1035 is employed as an alternative approach to stiffening the end portion of conduit 1030" where inserted into conduit-receiving opening 1021 of the conduit connector. In the embodiments of FIGS. 13B & 13C, the retention component(s) further includes one or more retention rings 1027', which in the embodiments depicted, include one or more inner circumferential protrusions positioned to facilitate applying a holding force to the conduit, either directly or indirectly, via the one or more releasable retention arms, when the conduit and retention ring(s) are positioned within the conduit-receiving openings.

Figure 13D:
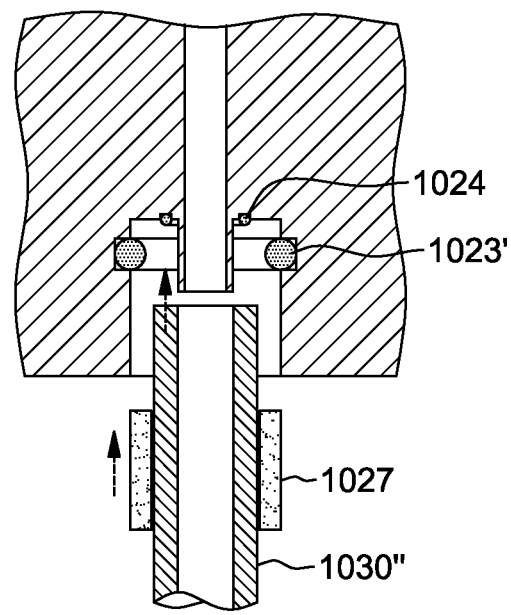
FIG. 13D is a cross-sectional plan view of another alternate embodiment of a conduit connector and liquid manifold, in accordance with one or more aspects of the present invention.
Figure 13E:
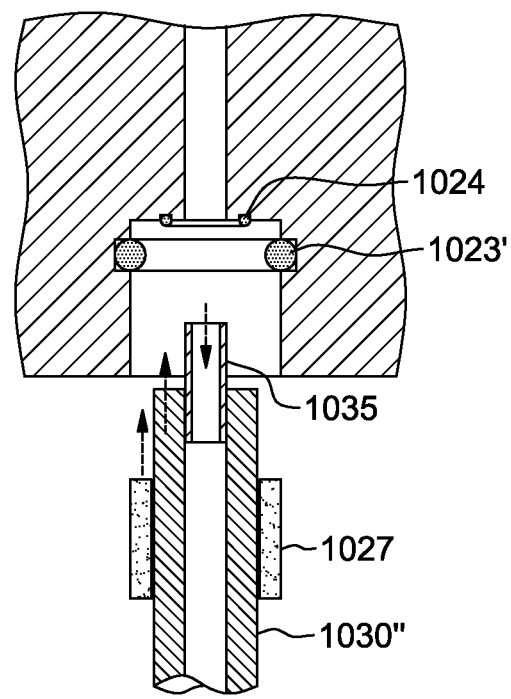
FIG. 13E is a cross-sectional plan view of another alternate embodiment of a conduit connector and liquid manifold, in accordance with one or more aspects of the present invention.

In the embodiments of FIGS. 13D & 13E, the releasable retention arm(s) is removed, and the at least one retention component comprises one or more retention rings 1027 sized to apply the desired compressive force to conduit 1030" when positioned within conduit-receiving opening 1021 to securely, threadlessly hold the conduit within the conduit-receiving opening. In this embodiment, tubular insert 1014 may be provided, or separate tubular insert 1035 may be provided, to enhance rigidity of the end portion of conduit 1030", as well as facilitate secure coupling of the conduit to the liquid manifold via the conduit connector.

Note that the separate tubular insert 1035, if used, may extend partially into the at least one liquid-carrying channel 1012 of the liquid manifold to provide further coupling between the conduit and the liquid manifold. In the embodiments of FIGS. 13D & 13E, one or more enlarged radial-sealing rings 1023' may also be employed to securely engage and hold the outer periphery of the conduit 1030" and thereby assist in threadless securing of the conduit within the conduit-receiving opening when operatively positioned within the opening. Note that the enlarged sealing ring 1023' may be fabricated of the same or different material than the one or more retention rings 1027.

Figure 14A:
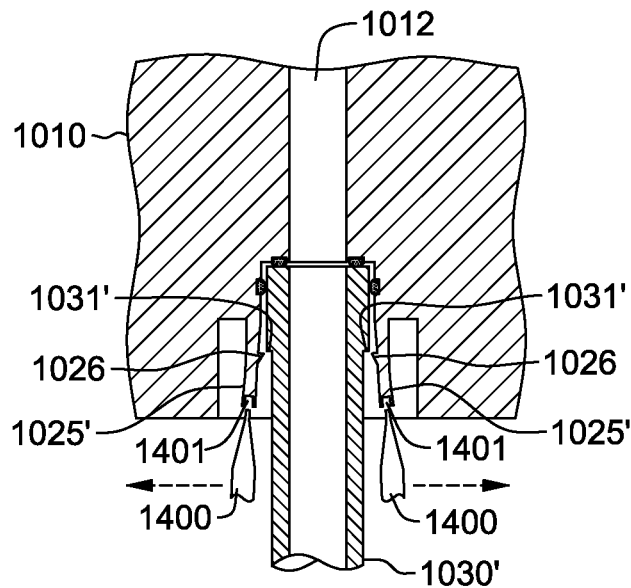
FIG. 14A is a cross-sectional plan view of a liquid manifold and an integrated conduit connector, manipulated to facilitate release of the conduit, in accordance with one or more aspects of the present invention.
Figure 14B:
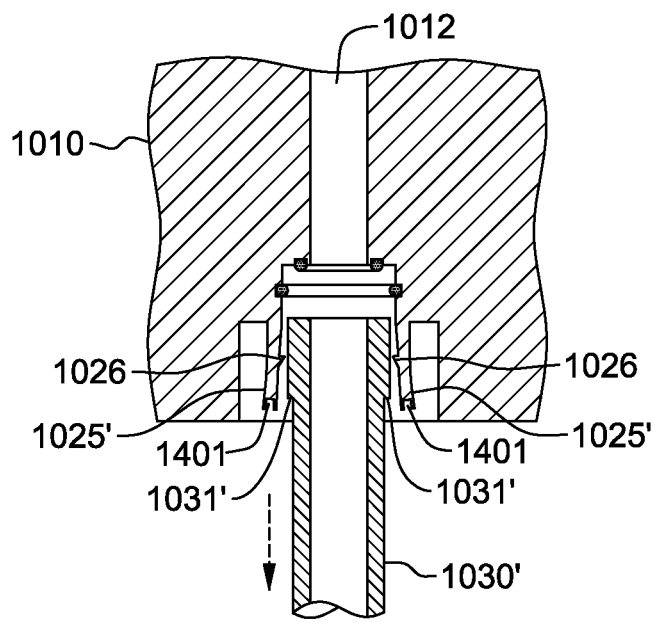
FIG. 14B depicts the apparatus of FIG. 14A, with the conduit shown being withdrawn from the conduit-receiving opening of the conduit connector, in accordance with one or more aspects of the present invention.

FIGS. 14A & 14B depict the apparatus of FIG. 10D, with grooves or notches 1401 shown added in the ends of the releasable retention arms 1025' to facilitate engagement of the releasable retention arms 1025' via a tool 1400 in order to allow for manipulation of the arms during insertion or withdrawal of the conduit 1030' from the conduit-receiving opening 1021 of the conduit connector. In the embodiment illustrated, tool 1400 may be used to, for instance, bend the releasable retention arms 1401 to allow unlatching of the inwardly-extending raised feature(s) from the notch 1031 in conduit 1030' to allow the conduit to be withdrawn. Note that in this example, it is assumed that the retention ring has already been withdrawn from engagement with the releasable retention arms and conduit.

Those skilled in the art will note that provided herein are apparatuses, such as coolant-cooled assemblies, and methods of fabrication thereof, which include a conduit connector that releasably, threadlessly forms a fluid-tight connection between a conduit, or more particularly, an end portion of a conduit, and a liquid manifold. The liquid manifold includes at least one liquid-carrying channel, and the conduit connector is integrated, at least in part, within the liquid manifold, and includes a conduit-receiving opening disposed within the liquid manifold and in fluid communication with the at least one liquid-carrying channel of the liquid manifold, and one or more releasable retention components selectively operative to threadlessly secure in a fluid-tight manner a conduit within the conduit-receiving opening in fluid communication with the liquid-carrying channel(s) of the liquid manifold to facilitate flow of liquid, such as flow of a liquid coolant, therethrough, or to release the conduit from the conduit-receiving opening of the conduit connector. The releasable retention component(s) resides at least partially within the liquid manifold when operatively, threadlessly securing the conduit within the conduit-receiving opening.

In one or more implementations, the conduit connector includes multiple releasable retention components which selectively operate to threadlessly secure the conduit within the conduit-receiving opening in fluid communication with the at least one liquid-carrying channel of the liquid manifold to facilitate flow of liquid therethrough. The multiple releasable retention components reside, at least partially, within the liquid manifold, and in particular, within the conduit-receiving opening when operatively, threadlessly securing the conduit within the conduit-receiving opening. By way of example, the multiple releasable retention components may include multiple releasable retention arms integrated with the liquid manifold and extending into the conduit-receiving opening. The multiple releasable retention arms physically engage the conduit when the conduit is positioned within the conduit-receiving opening, and may be bendable to allow for insertion of the conduit into the conduit-receiving opening, or release of the conduit from the conduit-receiving opening. One or more releasable retention arms may include one or more inwardly-extending raised features configured to physically engage the conduit when the conduit is positioned within the opening or socket. In such an embodiment, the conduit may include one or more notches positioned to be engaged by the one or more inwardly-extending raised features of the releasable retention arm(s) with positioning of the conduit within the conduit-receiving opening of the conduit connector.

The multiple releasable retention components of the conduit connector may include, in one implementation, a first type of releasable retention component and a second type of releasable retention component, where the first and second types of releasable retention components are different types of releasable retention components. For instance, the first type of releasable retention component may include one or more releasable retention arms, and the second type of releasable retention component may include one or more retention rings. The one or more releasable retention arms may be integrated with the liquid manifold and extend into the conduit-receiving opening to physically engage the conduit with positioning of the conduit within the opening. The retention ring(s) applies a holding force to at least one of the releasable retention arm(s) or the conduit to threadlessly secure the conduit within the conduit-receiving opening.

In another implementation, the at least one releasable retention component of the conduit connector may include a retention ring, where the retention ring encircles, at least in part, a portion of the conduit when positioned within the conduit-receiving opening to threadlessly secure the conduit within the conduit-receiving opening. One or more inner-circumferential protrusions may be positioned on the retention ring to facilitate applying a holding force to the conduit when the conduit and ring are positioned within the conduit-receiving opening.

In another embodiment, the releasable retention component(s) may include one or more releasable retention arms integrated with the liquid manifold and extending into the conduit-receiving opening to physically engage the conduit when the conduit is positioned within the opening. The releasable retention arm(s) may include one or more inwardly-projecting raised features configured to engage the conduit when the conduit is positioned within the opening to facilitate threadless securing of the conduit within the conduit-receiving opening. The conduit may be formed to include one or more notches positioned to be engaged by the inwardly-projecting raised features of the releasable retention arm(s) with positioning of the conduit within the conduit-receiving opening of the conduit connector. The releasable retention arm(s) may be bendable to allow for insertion of the conduit into the conduit-receiving opening, or release of the conduit from the conduit-receiving opening, with the conduit-receiving opening being appropriately sized to allow for bending of the releasable retention arm(s).

In one implementation, the conduit connector may further include one or more radial-sealing rings and/or one or more facial-sealing rings within the liquid manifold and exposed, at least in part, within the conduit-receiving opening to engage an outer periphery of the conduit, or an end of the conduit, respectively, with threadless securing of the conduit within the conduit-receiving opening. The sealing rings are provided to facilitate fluid-tight sealing of the conduit to the liquid manifold using the conduit connector.

The liquid manifold may comprise various types of housings, with one or more liquid-carrying channels within the housing, and one or more liquid inlets and one or more liquid outlets to the housing, with one or more conduit connectors such as summarized above being integrated at the inlet(s) and/or outlet(s) of the manifold or housing.

In one embodiment, the liquid manifold is part of a coolant-cooled structure, such as described above in connection with the cooling apparatuses and systems of FIGS. 2-9C.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:
   molding a liquid manifold comprising at least one liquid-carrying channel and a conduit connector disposed, at least in part, within the liquid manifold; and
   wherein the molding comprises:
   providing a conduit-receiving opening within the liquid manifold and in fluid communication with the at least one liquid-carrying channel of the liquid manifold; and
   molding at least one releasable retention arm as part of the liquid manifold, and recessed within the liquid manifold, and residing substantially within the conduit-receiving opening, the at least one releasable retention arm being selectively operative to threadlessly secure in a fluid-tight manner a conduit within the conduit-receiving opening in fluid communication with the at least one liquid-carrying channel of the liquid manifold to facilitate flow of liquid therethrough, or to release the conduit from the conduit-receiving opening of the conduit connector, the at least one releasable retention arm having opposite first and second surfaces residing at least partially within the liquid manifold, the opposite first and second surfaces being radially an inner surface, and radially an outer surface, respectively, of the at least one releasable retention arm.

2. The method of claim 1, wherein the conduit connector comprises multiple releasable retention components selectively operative to threadlessly secure the conduit within the conduit-receiving opening in fluid communication with the at least one liquid-carrying channel of the liquid manifold to facilitate flow of liquid therethrough, the multiple releasable retention components comprising the at least one releasable retention arm, wherein the multiple releasable retention components reside at least partially within the liquid manifold when operatively threadlessly securing the conduit within the conduit-receiving opening.

3. The method of claim 2, wherein the multiple releasable retention components comprise multiple releasable retention arms molded as part of the liquid manifold and extending into the conduit-receiving opening, the multiple releasable retention arms physically engaging the conduit when the conduit is positioned within the conduit-receiving opening.

4. The method of claim 3, wherein the multiple releasable retention arms are bendable to allow for insertion of the conduit into the conduit-receiving opening, or release of the conduit from the conduit-receiving opening.

5. The method of claim 4, wherein at least one releasable retention arm of the multiple releasable retention arms comprises at least one inwardly-extending raised feature configured to physically engage the conduit when the conduit is positioned within the conduit-receiving opening.

6. The method of claim 5, wherein the apparatus further comprises the conduit, and the conduit comprises at least one notch positioned to be engaged by the at least one inwardly-extending raised feature of the at least one releasable retention arm with positioning of the conduit within the conduit-receiving opening of the conduit connector.

7. The method of claim 2, wherein the multiple releasable retention components of the conduit connector comprise a first type of releasable retention component and a second type of releasable retention component, wherein the first type of releasable retention component and the second type of releasable retention component are different types of releasable retention components.

8. A method comprising:
   providing a liquid manifold comprising at least one liquid-carrying channel; and
   integrating a conduit connector, at least in part, within the liquid manifold, the conduit connector comprising:
   a conduit-receiving opening within the liquid manifold and in fluid communication with the at least one liquid-carrying channel of the liquid manifold; and
   at least one releasable retention component selectively operative to threadlessly secure in a fluid-tight manner a conduit within the conduit-receiving opening in fluid communication with the at least one liquid-carrying channel of the liquid manifold to facilitate flow of liquid therethrough, or to release the conduit from the conduit-receiving opening of the conduit connector, the at least one releasable retention component residing at least partially within the liquid manifold when threadlessly securing the conduit within the conduit-receiving opening;
   wherein the conduit connector comprises multiple releasable retention components selectively operative to threadlessly secure the conduit within the conduit-receiving opening in fluid communication with the at least one liquid-carrying channel of the liquid manifold to facilitate flow of liquid therethrough, the multiple releasable retention components comprising the at least one releasable retention component, wherein the multiple releasable retention components reside at least partially within the liquid manifold when operatively threadlessly securing the conduit within the conduit-receiving opening;

wherein the multiple releasable retention components of the conduit connector comprise a first type of releasable retention component and a second type of releasable retention component, wherein the first type of releasable retention component and the second type of releasable retention component are different types of releasable retention components; and wherein the first type of releasable retention component comprises the at least one releasable retention arm, and the second type of releasable retention component comprises at least one compressible retention ring, the at least one releasable retention arm being integrated with the liquid manifold and extending into the conduit-receiving opening to physically engage the conduit with positioning of the conduit within the conduit-receiving opening, and the at least one compressible retention ring applying a holding force to at least one of the at least one releasable retention arm or the conduit to threadlessly secure the conduit within the conduit-receiving opening.

9. The method of claim 1, further comprising providing a retention ring, the retention ring encircling, at least in part, a portion of the at least one releasable retention arm and the conduit when the conduit is positioned within the conduit-receiving opening to threadlessly secure the conduit within the conduit-receiving opening.

10. The method of claim 9, wherein the retention ring comprises at least one inner-circumferential protrusion positioned to facilitate applying a holding force to the at least one releasable retention arm and the conduit when the conduit and the retention ring are positioned within the conduit-receiving opening.

11. The method of claim 1, wherein the at least one releasable retention arm physically engages the conduit when the conduit is positioned within the conduit-receiving opening.

12. The method of claim 11, wherein the at least one releasable retention arm comprises at least one inwardly-projecting raised feature configured to engage the conduit when the conduit is positioned within the conduit-receiving opening to facilitate threadlessly securing the conduit within the conduit-receiving opening.

13. The method of claim 12, wherein the conduit comprises at least one notch positioned to be engaged by the at least one inwardly-projecting raised feature of the at least one releasable retention arm with positioning of the conduit within the conduit-receiving opening of the conduit connector.

14. The method of claim 12, wherein the at least one releasable retention arm is bendable to allow for insertion of the conduit into the conduit-receiving opening, or release of the conduit from the conduit-receiving opening.

15. A method comprising:
providing a liquid manifold comprising at least one liquid-carrying channel; and
integrating a conduit connector, at least in part, within the liquid manifold, the conduit connector comprising:
a conduit-receiving opening within the liquid manifold and in fluid communication with the at least one liquid-carrying channel of the liquid manifold; and
at least one releasable retention component selectively operative to threadlessly secure in a fluid-tight manner a conduit within the conduit-receiving opening in fluid communication with the at least one liquid-carrying channel of the liquid manifold to facilitate flow of liquid therethrough, or to release the conduit from the conduit-receiving opening of the conduit connector, the at least one releasable retention component residing at least partially within the liquid manifold when threadlessly securing the conduit within the conduit-receiving opening; and
wherein the conduit connector further comprises at least one radial-sealing ring and at least one facial-sealing ring within the liquid manifold and exposed, at least in part, within the conduit-receiving opening to engage an outer periphery of the conduit and an end of the conduit, respectively, with threadless securing of the conduit within the conduit-receiving opening.

* * * * *